United States Patent

Ohta

[11] Patent Number: 5,125,139
[45] Date of Patent: Jun. 30, 1992

[54] HYDRAULIC DRIVE MECHANISM IN MACHINE TOOL

[76] Inventor: Tadashi Ohta, No. 312-1, Jorinji, Okou-cho, Nangoku-shi, Kochi, Japan

[21] Appl. No.: 722,136

[22] Filed: Jun. 27, 1991

[51] Int. Cl.⁵ .................... B23Q 5/26; F15B 13/04
[52] U.S. Cl. ................... 29/26. A; 91/410; 408/130; 409/212
[58] Field of Search ............ 29/56.5, 50, 51, 39, 29/54, 560, 26 A, 26 R; 409/236, 212, 202; 408/130; 91/410, 392, 403, 380, 433; 82/132, 141

[56] References Cited

U.S. PATENT DOCUMENTS

| | | | |
|---|---|---|---|
| 1,877,701 | 9/1932 | Speck et al. | 91/410 |
| 3,244,077 | 4/1966 | Mary | 409/202 |
| 3,274,891 | 9/1966 | Rollat | 409/212 X |
| 4,658,485 | 4/1987 | Yang | 29/26 A |
| 4,901,627 | 2/1990 | Schulze | 91/380 X |

FOREIGN PATENT DOCUMENTS 16130 10/1982 Japan .................... 91/410

Primary Examiner—William Briggs
Attorney, Agent, or Firm—Shlesinger, Arkwright & Garvey

[57] ABSTRACT

A hydraulic drive mechanism in a machine tool, in which both the ends of a feed rod connected to front-ward/reverse rotation drive means are journaled in bearings by a base frame and a cylinder frame, a feed plate is threadably mounted on the feed rod between the cylinder frame and the base frame, reciprocatively movable members are connected to the rods of double-acting cylinders, the primary chambers and secondary chambers of these cylinders are respectively connected to the primary chambers and secondary chambers of double-acting drive cylinders being oil pressure sources for the first-mentioned cylinders, the drive cylinders are fixed to one surface of the cylinder frame and have their rods inserted through holes provided in the cylinder frame, the distal ends of the rods of the drive cylinders turnably connected to the feed plate, and the other surface of the cylinder frame is confronted to the base frame with a proper spacing therebetween. In addition, drive-cylinder transfer valves which communicate and shut off the primary and secondary chambers of the drive cylinders are interposed in pipe lines laid between these chambers.

11 Claims, 14 Drawing Sheets

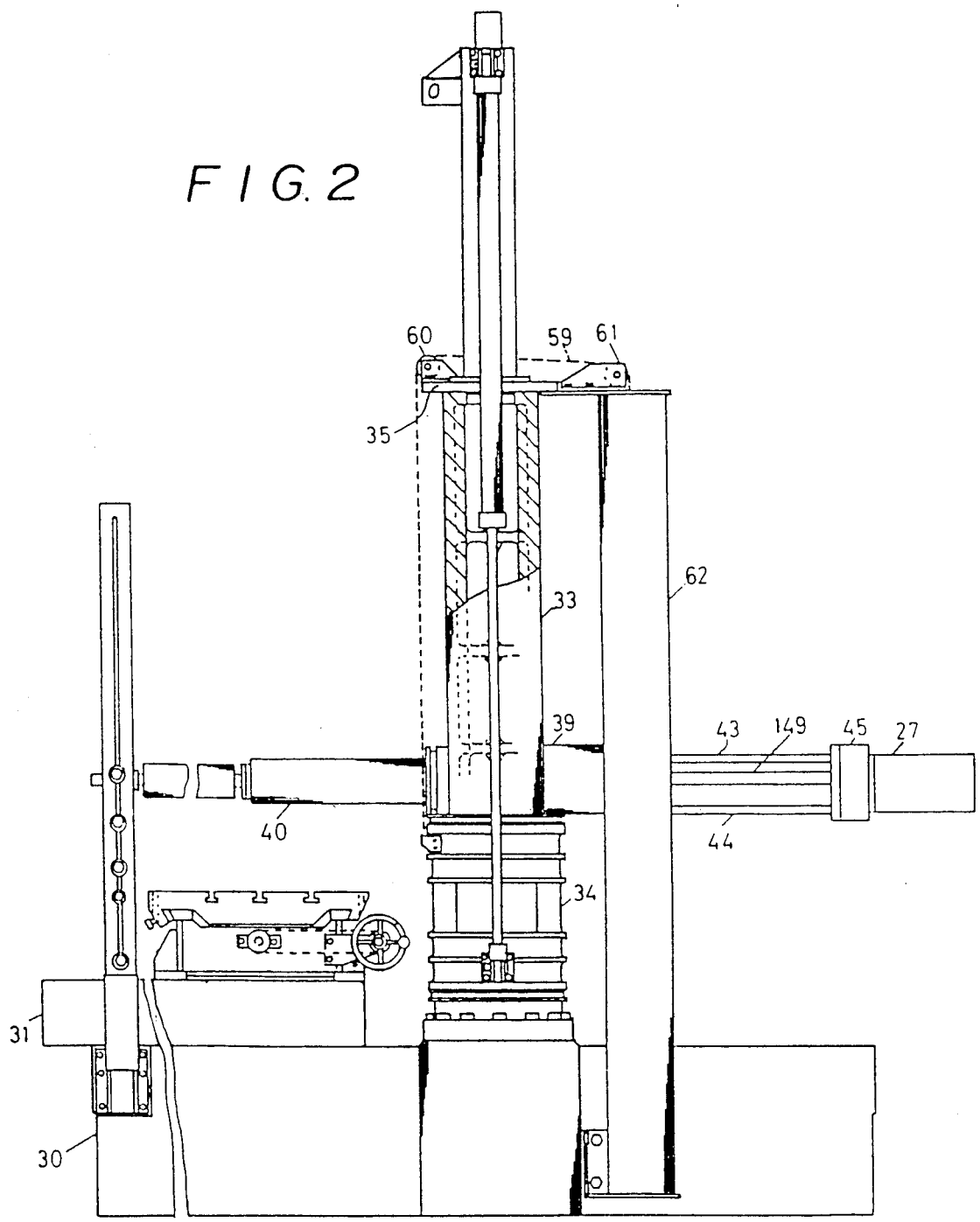

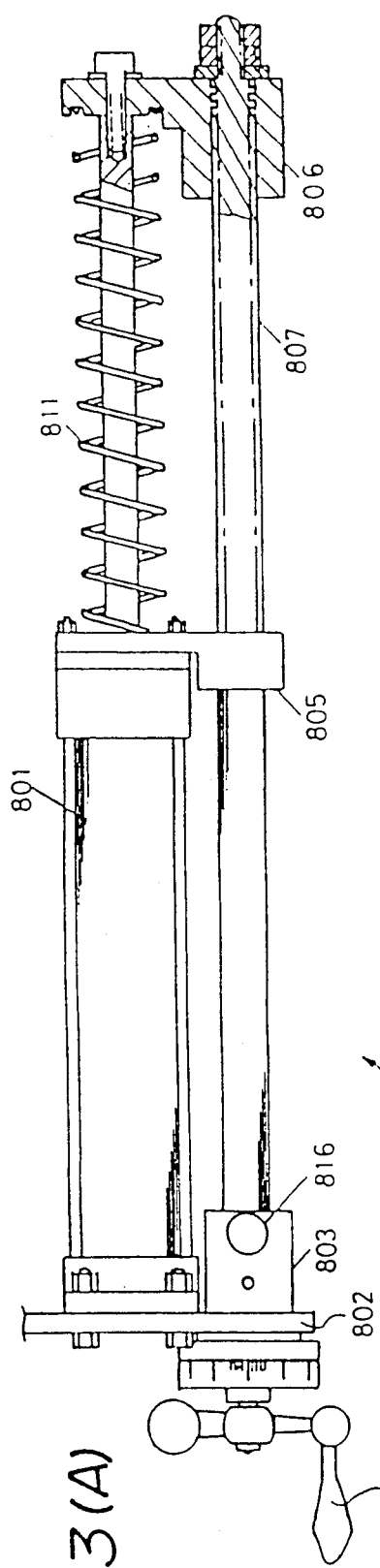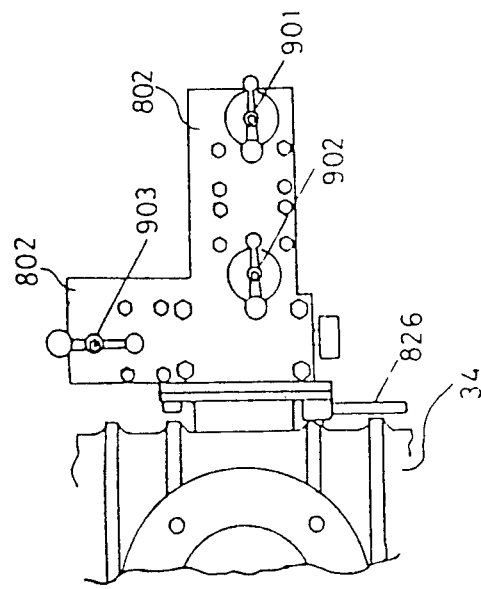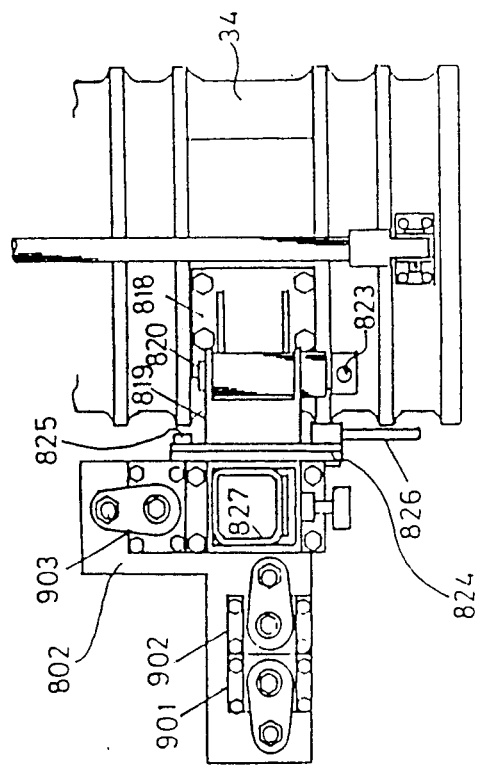

FIG. 4(D)
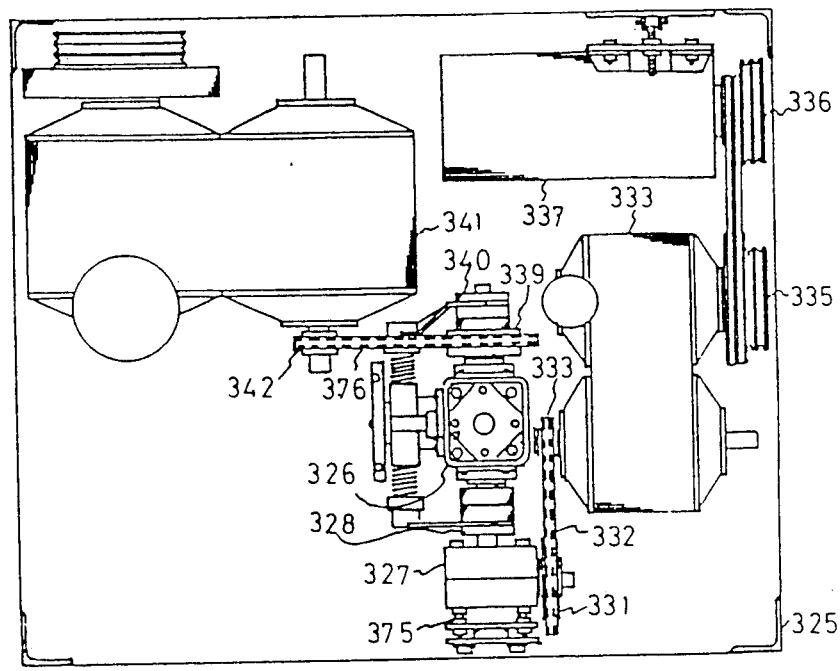
FIG. 4(E)
FIG. 4(F)
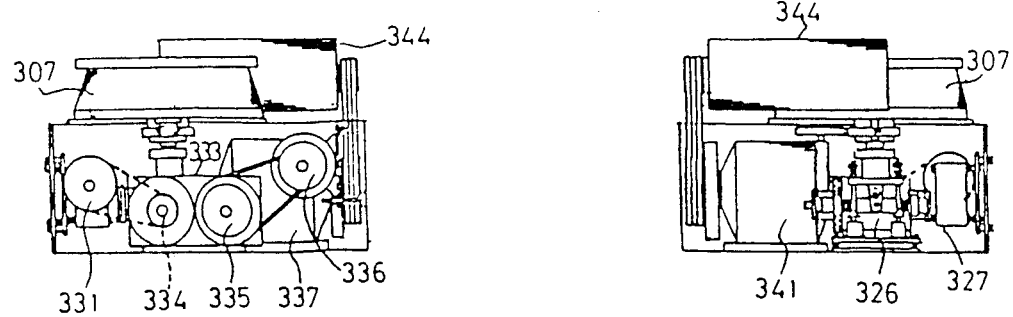
FIG. 4(G)
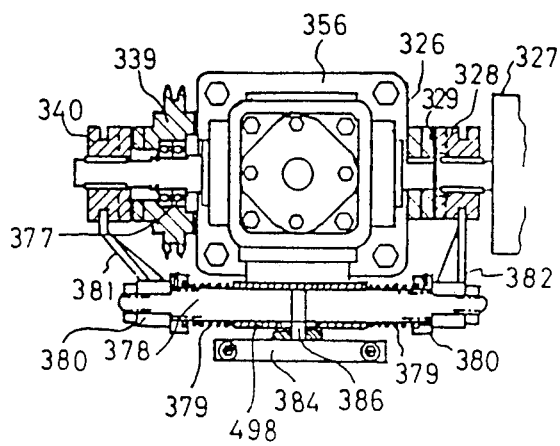

FIG.4(H)
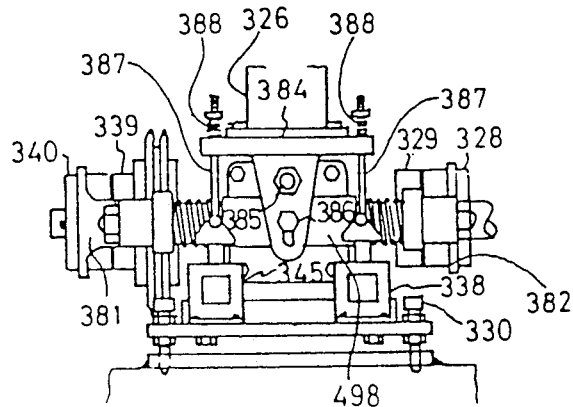
FIG.4(J)
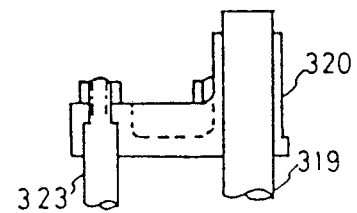
FIG.4(I)
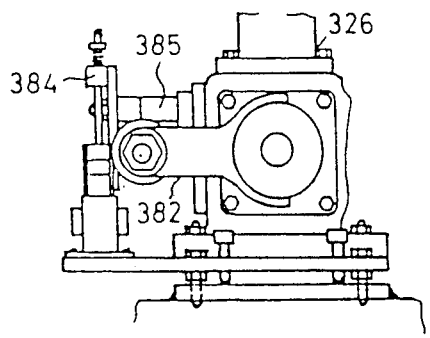
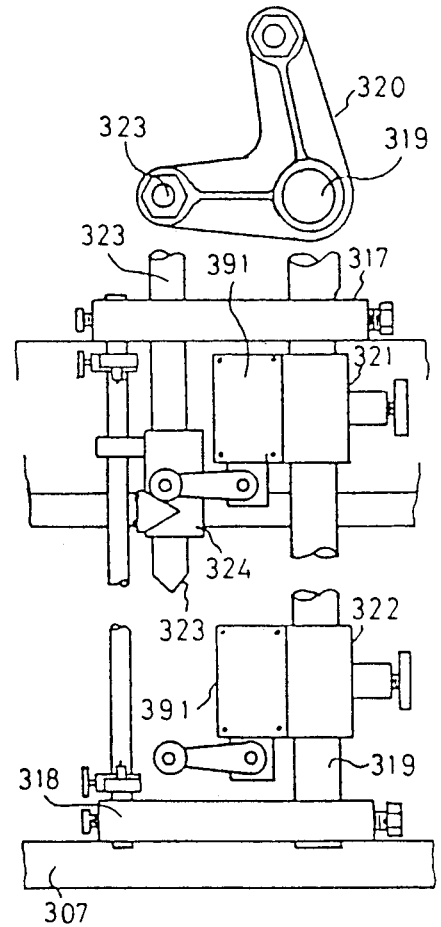
FIG.4(L)
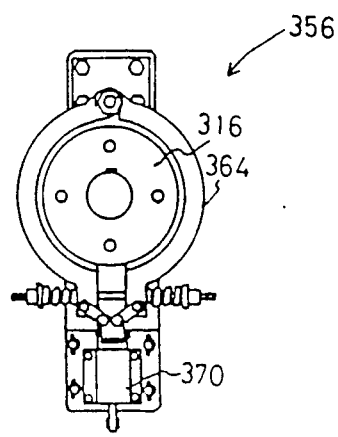
FIG.4(K)
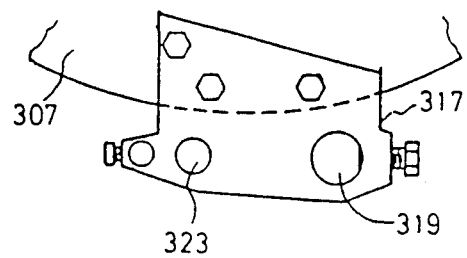

FIG. 5(G)
FIG. 5(H)
FIG. 5(I)
FIG. 5(J)
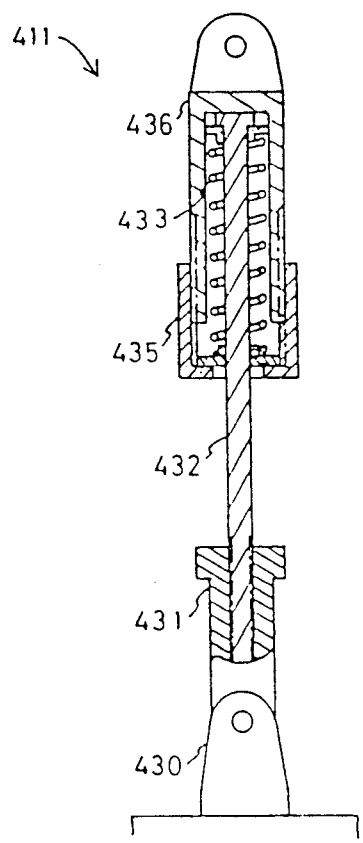
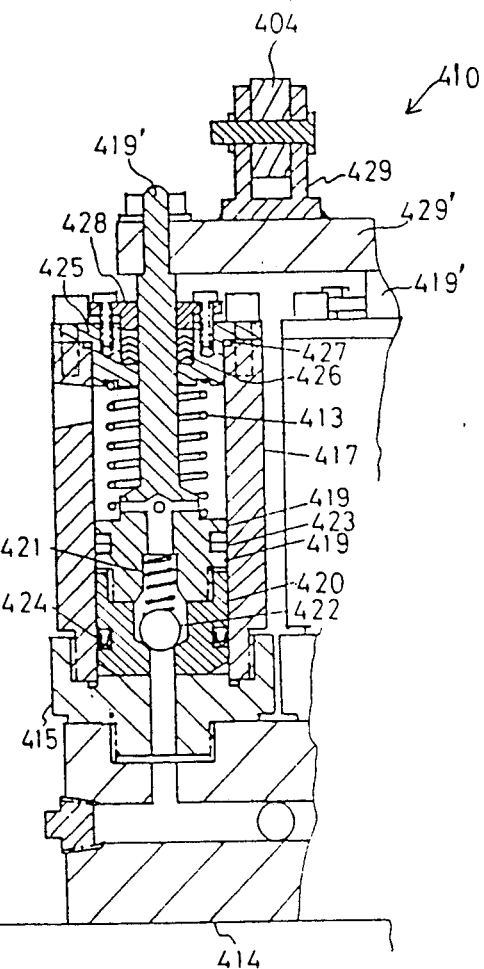
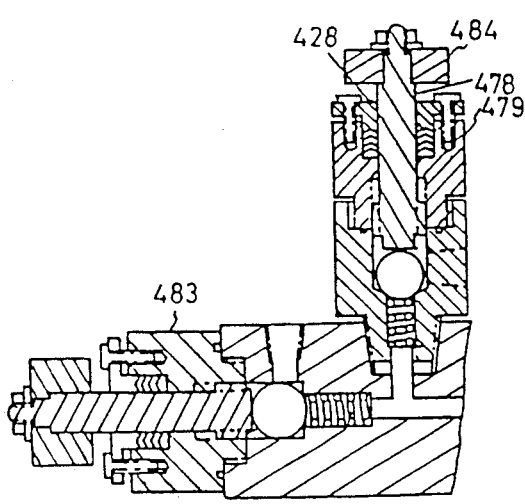

HYDRAULIC DRIVE MECHANISM IN MACHINE TOOL

BACKGROUND OF THE INVENTION

1. Field of the Invention

The present invention relates to a hydraulic drive mechanism in a machine tool. More particularly, it relates to a hydraulic drive mechanism by which a cylinder for actuating a movable member adapted to reciprocate in a machine tool, such as milling machine, boring machine or universal machine tool, is supplied with pressure oil so as to be driven.

2. Description of the Prior Art

As conventional machine tools, there are a milling machine, a boring machine, a planing machine, a grinding machine, a drilling machine, etc. Further, the milling machine includes vertical and horizontal ones, while the boring machine similarly includes vertical and horizontal ones.

In a large-sized machine tool, for example, a large-sized milling machine, boring machine or planing machine, a table for placing a workpiece thereon is slidably disposed on the upper surface of a large-sized bed so as to extend in the lengthwise direction of the bed. Two columns which are perpendicular to the upper surface of the table are erected in the shape of gateposts on both the sides of the table in the widthwise direction thereof. Column guides are respectively mounted on the two columns so as to be vertically slidable. A cross girder is fixed between the column guides, and it is contrived so as to be vertically movable in the direction perpendicular to the upper surface of the table. In addition, a saddle which is slidable in parallel with the upper surface of the table is mounted on one side surface of the cross girder.

Besides, in the planing machine, a tool rest which is provided with a cutting tool holder being vertically movable is attached to the saddle, or the tool rest is slidably mounted on the cross girder instead of the saddle.

On the other hand, in the large-sized milling machine or the large-sized boring machine, a spindle head 39 of cylindrical shape whose axial direction intersects orthogonally to the sliding direction of the saddle is fixed to the saddle, a spindle guide is fitted in the inner circumference of the spindle head so as to extend axially of the spindle head, and a spindle is rotatably mounted in the spindle guide. Herein, the distal end of the spindle is provided with a cutting tool holder on which a tool, such as milling cutter or boring bar, for machining the workpiece placed on the upper surface of the table is set.

The various conventional machine tools are, in general, dedicated machine tools which function alone, respectively. Meanwhile, each of many workpieces to be machined requires machining processes by several sorts of machine tools, so that the different sorts of machine tools must be used in correspondence with the individual machining processes of the workpiece.

In a large workshop, accordingly, the various machining processes of the various workpieces can be coped with by installing the large number of various machine tools in the workshop. In a small workshop, however, the number of the various machine tools to be installed is limited, which has led to the problem that coping with many sorts of workpieces or machining operations is difficult. Especially, the large-sized machine tools are limited in the installation number even in the large workshop.

Further, the activity rates of the various machine tools become high in case of mass production. In case of multikind and small-quantity production, however, there has been the problem that the activity rate of each machine tool becomes low in spite of the necessity of the large number of various machine tools.

In order to eliminate this problem, therefore, a system capable of many sorts of machining operations with a single machine tool, for example, a universal machine tool or an NC machining center, has been developed.

The universal machine tool or the large-sized machine tool, such as the milling machine as well as the boring machine or the planing machine stated above, includes an increased number of movable members adapted to reciprocate, for example, the table, column guides, saddle or/and spindle.

According to the machine tool in the prior art, in order to actuate the respective movable members, feed screws are individually connected to motors being rotation drive means through clutches as well as brakes, and the respective members to be actuated are fixed to corresponding feed arms held in threadable engagement with the feed screws. Thus, the motors are rotated frontwards and reversely to rotate the feed screws and to move the feed arms axially of feed rods, whereby the movable members are reciprocatively actuated so as to machine a workpiece.

In the prior-art machine tool wherein the respective movable members are reciprocated by the rotations of the feed screws, the motors which are the rotation drive means of the movable members need to be individually disposed. This has posed the problems of a complicated structure and an increased manufactural cost.

As another problem, since the movable members are respectively moved by directly transmitting the rotations of the feed screws connected to the individual motors, the fine adjustments of the motions are structurally limited on account of the moments of inertia.

Moreover, for the purpose of machining the workpiece at high precision, the motions of the respective movable members need to be finely adjusted, and the feed speeds of the movable members must be kept low. In rendering the high- and low-speed motions of the movable members compatible, the respective movable members need to be connected to the individual motors through the clutches, the brakes and reduction gears. This has led to the problem that the whole system becomes complicated and large-sized.

SUMMARY OF THE INVENTION

The present invention has been developed in order to solve the problems mentioned above, and has for its object to provide a hydraulic drive mechanism in a machine tool such as universal machine tool or large-sized machine tool, which permits a plurality of reciprocatively movable members to move efficiently and precisely and which has a simple structure.

To the accomplishment of the object, with a hydraulic drive mechanism in a machine tool according to the present invention, in the machine tool such as milling machine, boring machine or universal machine tool stated in the section of the prior art, one or more of the plurality of reciprocatively movable members are respectively connected to the rods of double-acting cylinders, and the primary chambers and secondary chambers of the cylinders are respectively connected to the primary chambers and secondary chambers of double-acting drive cylinders being oil pressure sources which correspond to the first-mentioned cylinders, while drive-cylinder transfer valves which communicate and shut off the primary and secondary chambers of the corresponding drive cylinders are respectively interposed in pipe lines laid between these chambers. The rods of the drive cylinders are respectively inserted through a plurality of through holes which are provided in a cylinder frame, and all the drive cylinders are fixed to one surface of the cylinder frame. The other surface of the cylinder frame is confronted to a base frame through an appropriate spacing, and both the ends of a feed rod which is connected to frontward-/reverse rotation drive means are respectively journaled in bearings by the base frame and the cylinder frame. A feed plate is threadably mounted on the feed rod midway between the cylinder frame and the base frame, and the distal ends of the rods of the respective drive cylinders are turnably connected to the feed plate.

Further, the primary chambers and secondary chambers of the plurality of cylinders are respectively connected to the primary chamber and secondary chamber of one plunger pump being the oil pressure sources of the cylinders through corresponding primary-chamber transfer valves and secondary-chamber transfer valves, and the plunger pump is mounted on a base. Besides, a solenoid is mounted on the base with an appropriate spacing set from the plunger pump, and the rod of the solenoid and the piston rod of the plunger pump are turnably connected to both the ends of a pump lever, respectively. Still further, a scale bar which is substantially parallel to the pump lever is mounted on a side opposite to the solenoid while extending orthogonally to the rod actuating direction of the solenoid, and both the ends of the scale bar are fixed to two struts erected on the base. Incidentally, a scale is graduated in the lengthwise direction of the scale bar. Yet further, a slide bracket is mounted so as to be slidable and adjustably movable in the lengthwise direction of the scale bar, and a fulcrum pin is protrusively mounted in the slide bracket. Herein, the fulcrum pin is permitted to abut against the surface of the pump lever on the side on which the solenoid rod is actuated, and also to slide on this surface of the pump lever in the lengthwise direction thereof.

In addition, the primary chambers and secondary chambers of the plurality of cylinders are respectively connected to the primary chambers and secondary chambers of corresponding ones of a plurality of manual feed cylinders formed of double-acting cylinders through primary-chamber transfer valves and secondary-chamber transfer valves, and feed screws are journaled in bearings so as to extend in the lengthwise directions of the corresponding manual feed cylinders. Herein, a guide section is threadably mounted on one end side of each of the feed screws so as to be movable through the rotation of the feed screw, and one end of the guide section is fixed to the distal end of the rod of the corresponding manual feed cylinder.

BRIEF DESCRIPTION OF THE DRAWINGS

The above and other objects and advantages of the invention will become apparent from the following detailed description of preferred embodiments taken in conjunction with the accompanying drawings wherein the same numerals designate like elements, and wherein:

FIG. 2 is a side view of the machine tool in which a spindle guide is held in a horizontal state;

FIG. 3(A) is a side view of a manual feed apparatus, FIG. 3(B) is a front view of a portion for mounting manual feed apparatuses, FIG. 3(C) is a rear view corresponding to FIG. 3(B)

FIG. 4(D) is a plan view of a gear box and rotation drive means, FIGS. 4(E) and 4(F) are both side views corresponding to FIG. 4(D), FIG. 4(G) is a plan view of a clutch change-over device, FIG. 4(H) is a front view corresponding to FIG. 4(G), FIG. 4(I) is a side view corresponding to FIG. 4(H), FIG. 4(J) is a front view of means for sensing the upper limits and lower limits of the hydraulic drive cylinders, FIG. 4(K) is a view of the mounted bottom of a bracket in FIG. 4(J), and FIG. 4(L) is a plan view of an electromagnetic brake;

FIGS. 5(G) and 5(H) are sectional views of the essential portions of a supporter and a plunger pump connected thereto as shown in FIG. 5(D), respectively, FIG. 5(I) is a sectional view of manual valves, FIGS. 5(J) and 5(K) are sectional views of the base block of the manual valve kit.

FIG. 7(A) shows a plan view of a bed, while

DETAILED DESCRIPTION OF THE PREFERRED EMBODIMENTS

Figure 4A:
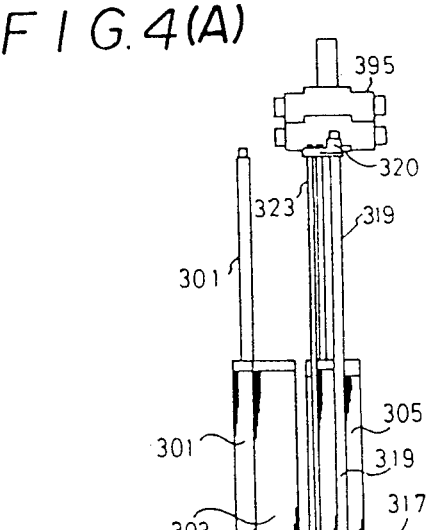
FIG. 4(A) is a front view of a hydraulic drive system.

FIG. 4(A) illustrates a hydraulic drive system, which serves to supply pressure oil to a plurality of cylinders for actuating a plurality of reciprocatively movable members in a machine tool, respectively.

TABLE

Figure 1:
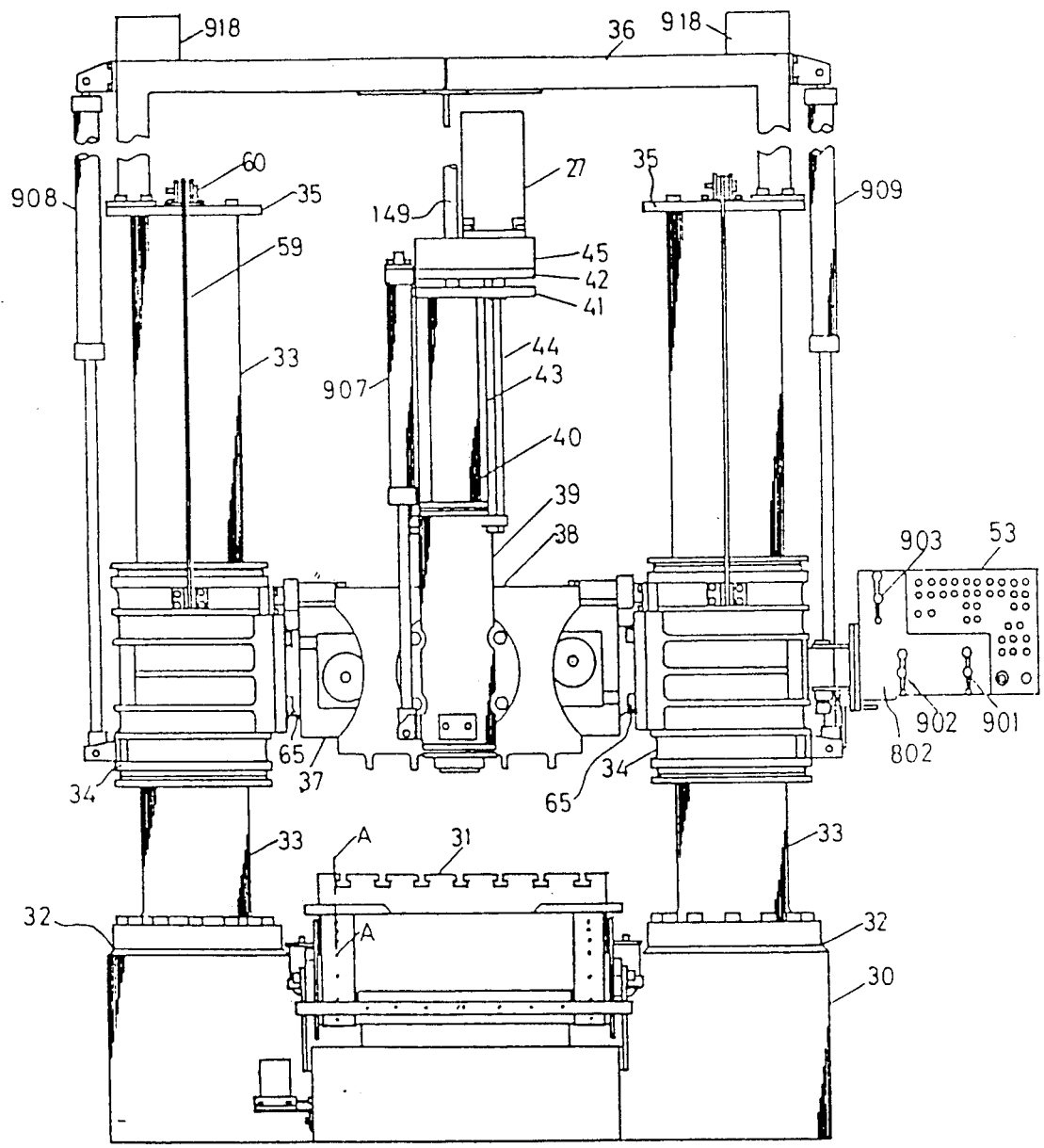
FIG. 1(A) is a front view of a machine tool which is used as an example for elucidating a hydraulic drive mechanism according to the present invention.
FIG. 1(B) is a side view of the machine tool.
FIG. 1(C) is an arrangement plan of various switches.
FIG. 1(D) is a front view of an actuating mechanism for a cross girder and a saddle.
FIG. 1(E) is a rear view of the actuating mechanism for the cross girder and the saddle.
Figure 1B:
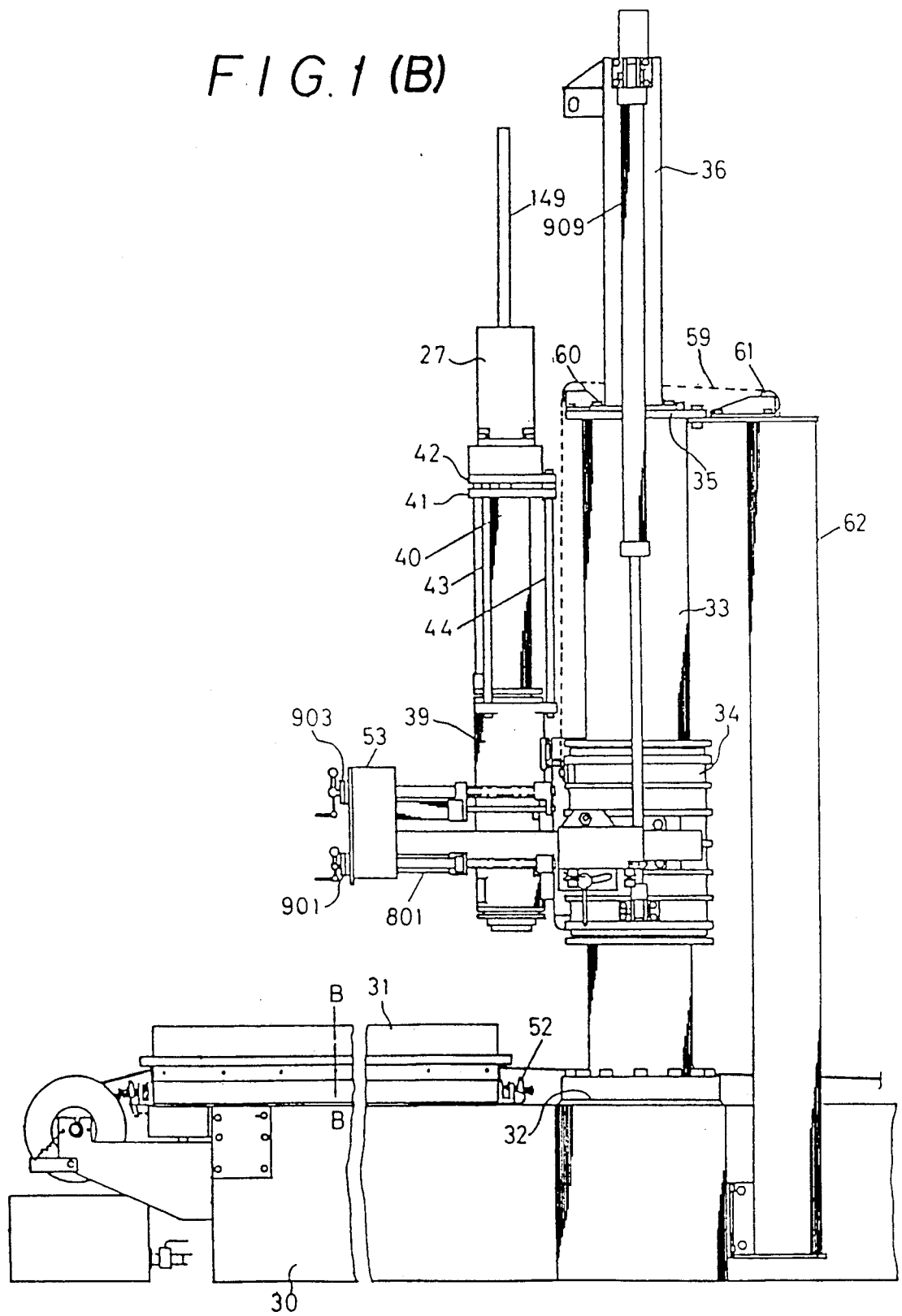
Figure 1:
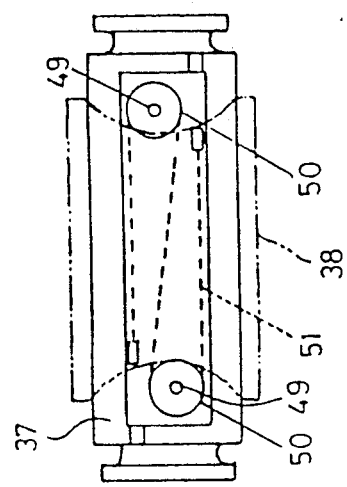
Figure 1:
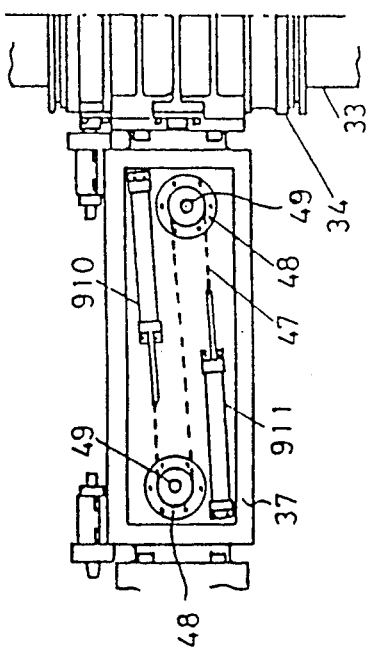
Figure 1:
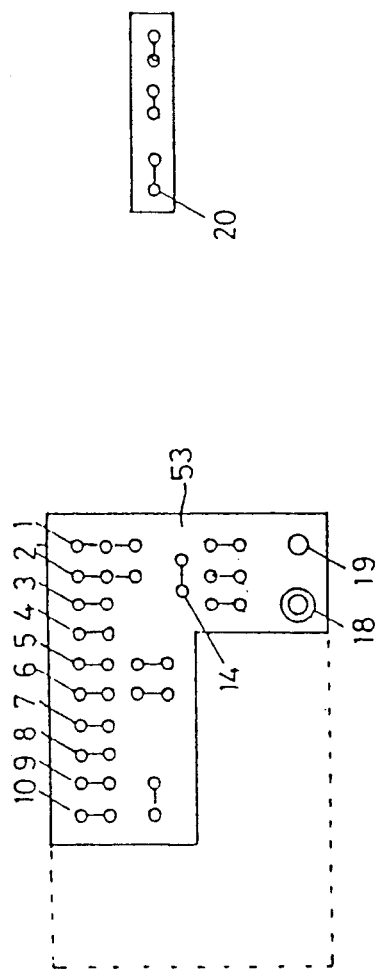

Referring to FIGS. 1(A) and 1(B), numeral 30 designates a bed, which is formed by solid casting so as to include a table sliding portion on its upper surface and column mounting surfaces 32, 32 on both the sides of the table sliding portion in the widthwise direction of this bed. A table 31 which is a movable member adapted to reciprocate in the lengthwise direction of the bed 30, is slidably placed on the table sliding portion of this bed. More specifically, two parallel slots which extend in the lengthwise direction of the bed 30 is provided in the upper surface of this bed, and two parallel protrusions which are snugly fitted in the grooves are provided on the bottom surface of the table 31, whereby the table 31 is slidably placed on the bed 30 with the two parallel protrusions of the table 31 fitted in the two parallel slots of the bed 30.

TABLE CYLINDERS

Double-acting table cylinders 912, 913 are disposed under both the ends of the table 31 in the lengthwise direction thereof with the distal ends of their rods opposing to each other, and sprockets are respectively secured to the distal ends of the rods. Besides, one end of each of chains is fixed to a chain fixture 52 which is mounted on each of both the end surfaces of the table 31 in the lengthwise direction thereof, the chain is wound round the sprocket at the distal end of the rod of the corresponding one of the table cylinders 912, 913, and the other end of the chain is fixed to the bottom surface of the bed 30 [FIGS. 7(A) and 7(B)]. Accordingly, when the pressure oil is supplied into the primary chambers of the table cylinders 912, 913 in FIG. 7(A), the rods of both the cylinders 912, 913 are moved rightwards, and the sprocket secured to the distal end of the rod of the left table cylinder 912 pulls rightwards the chain which is fixed at one end thereof to the left end surface of the table 31, so that the table 31 is moved rightwards. To the contrary, when the pressure oil is supplied into the secondary chambers of the table cylinders 912, 913, the rods of both the cylinders 912, 913 are moved leftwards, and the table 31 is moved leftwards.

COLUMNS, COLUMN MOUNTING SURFACES AND CROSS GIRDER

The column mounting surfaces 32, 32 are planes which are parallel to the table sliding surface of the table sliding portion. Two columns 33, 33 are respectively erected on the column mounting surfaces 32, 32 perpendicularly to these surfaces. The column flange portions of the columns 33, 33 on the lower end sides thereof are respectively fixed to the column mounting surfaces 32, 32 by bolts.

The upper ends of the columns 33, 33 are covered with upper lids 35, 35, and an inverted U-shaped trestle 36 is mounted on the upper lids 35, 35 transversely.

Column guides 34, 34 which are movable members adapted to reciprocate in the lengthwise directions of the columns 33, 33 are fitted around these columns so as to be vertically slidable, and a cross girder 37 in the shape of a box is transversely extended between the column guides 34, 34. More specifically, those surfaces of the column guides 34, 34 which oppose to each other are provided with flange surfaces, and flanges which are formed at both the end surfaces of the cross girder 37 are respectively fixed to the flange surfaces by bolts 65 numbering four for each of the flanges.

By the way, the cross girder 37 is fixed to the column guides 34, 34 so as to be turnable about an axis which is parallel to the sliding direction of a saddle 38 (to be described later) adapted to slide on the side surface of this cross girder 37.

COLUMN GUIDE CYLINDERS

Brackets are respectively provided at the upper end parts of the side surfaces of the right and left vertical posts of the trestle 36. An axial foot or clevis at one end of each of column guide cylinders 908, 909 formed of double-acting cylinders is connected to the corresponding one of the brackets, and the distal ends of the rods of the column guide cylinders 908, 909 are fixed to the side walls of the column guides 34, 34. Accordingly, when the pressure oil is supplied into the primary chambers or secondary chambers of the column guide cylinders 908, 909, the two column guides 34, 34 are vertically reciprocated along the two columns 33, 33, and hence, the cross girder 37 is vertically moved.

SADDLE

The saddle 38 which is a reciprocatively movable member is mounted on one side surface of the box-shaped cross girder 37 so as to be slidable in the lengthwise direction of the cross girder 37 [FIGS. 1(A) and 1(B)].

Figure 6A:
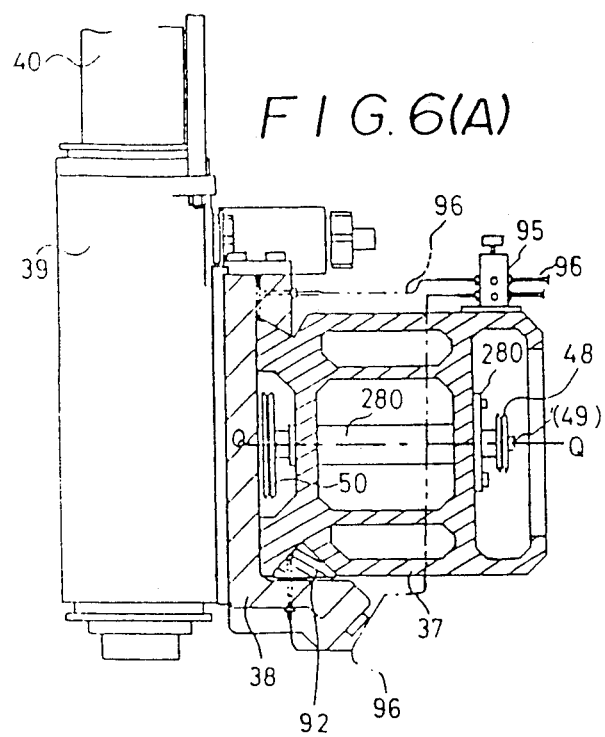
FIG. 6(A) is a vertical sectional view of the cross girder.
Figure 5L:
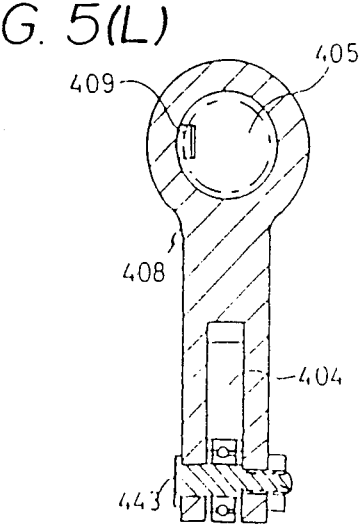
FIG. 5(L) is a sectional view of a slide bracket shown in FIG. 5(D)
Figure 6B:
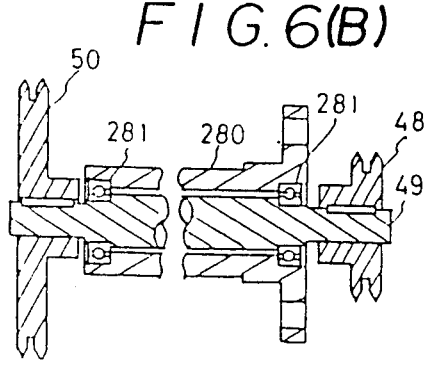
FIG. 6(B) is a sectional view taken along Q - Q in FIG. 6(A)
Figure 6C:
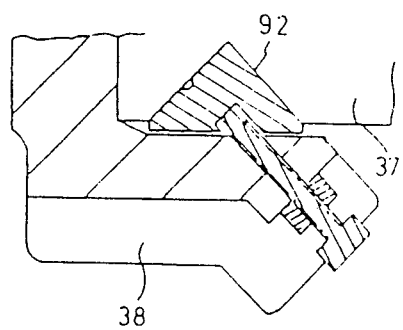
FIG. 6(C) is an enlarged sectional view of the essential portions of a saddle sliding portion.

Referring to FIGS. 1(D) and 1(E), two shafts 49 parallel to each other are extended in the cross girder 37 orthogonally to the sliding direction of the saddle 38. Sprockets 50, 50 are respectively wedged on the front end sides of the shafts 49 on the sheet of drawing of FIG. 1(A), while sprockets 48, 48 are respectively wedged on the rear end sides of the shafts 49. Incidentally, each of the shafts 49 is supported by a bearing stand 280 fixed to the cross girder 37, so as to be rotatable through two bearings 281 [FIGS. 6(A) and 6(B)].

SADDLE CYLINDERS

As illustrated in FIG. 1(E), a chain 47 is wound in the shape of letter S over the two sprockets 48, 48 located on the rear end sides of the shafts 49, and both the ends of the chain 47 are respectively connected to the distal ends of the rods of saddle cylinders 910, 911 each of which is formed of a double-acting cylinder fixed at one end to the cross girder 37. Accordingly, when the pressure oil is supplied into the primary chambers of the saddle cylinders 910, 911, the chain 47 is moved to rotate the sprockets 48, 48 counterclockwise in FIG. 1(E), and hence, the sprockets 50, 50 wedged to the shafts 49, 49 are rotated counterclockwise in FIG. 1(D). Then, since a chain 51 is wound in the shape of inverted letter S over the sprockets 50, 50 and has both its ends respectively fixed to the saddle 38, it is moved to move the saddle 38 leftwards in FIG. 1(D). To the contrary, when the pressure oil is supplied into the secondary chambers of the saddle cylinders 910, 911, the saddle 38 is moved rightwards.

SPINDLE HEAD

In addition, a spindle head 39 in a cylindrical shape is attached to the saddle 38 with its axial direction intersecting orthogonally to the sliding direction of the saddle 38, and a spindle guide 40 is mounted on the inner peripheral surface of the spindle head 39 so as to be slidable in the axial direction of this spindle head. [In FIG. 1(A), the axis of the spindle guide 40 is set perpendicular to the surface of the underlying table 31.]

SPINDLE GUIDE CYLINDER

Besides, one end of a spindle guide cylinder 907 constructed of a double-acting cylinder is connected to a support plate 41 mounted on the rear end of the spindle guide 40, and the distal end of the rod of the cylinder 907 is connected to the outer peripheral wall of the spindle head 39. Thus, the spindle guide 40 is vertically slidden inside the spindle head 39 by actuating the cylinder 907. By the way, in FIG. 1(A), a base plate 42 is mounted behind the rear end of the spindle guide 40, and it is fixed to the rear ends of a plurality of support rods 43 each of which is fixed at one end to the flange portion of the outer peripheral wall of the spindle head 39. Some of the support rods 43 are utilized as guide rods 44, which penetrate the support plate 41 mounted on the rear end of the spindle guide 40.

PROPELLER SHAFT AND SPLINE SHAFT

A motor 27 which is rotation drive means is mounted on the base plate 42 through reduction gears 45, and the front end of a spline shaft 149 which is the rotation output shaft of the reduction gears 45 is connected to the rear end of a propeller shaft 145 which is rotated inside the spindle guide 40. Besides, a spindle 141 is connected to the front end of the propeller shaft 145, and it is extended in a second spindle guide fixed to the front end of the first spindle guide 40. The front end of the spindle 141 is provided with a cutting tool holder in which a tool for machining a workpiece is set. Accordingly, the turning force of the motor 27 is transmitted to the spline shaft 149 through the reduction gears 45, and the spindle 141 is rotated through the spline shaft 149 as well as the propeller shaft 145, so that the machining tool, such as a milling cutter or a boring bar, set at the front end of the spindle 141 is rotated.

Incidentally, the spline shaft 149 penetrates a spline bush 150 in the reduction gears 45 so as to be slidable within this spline bush. Therefore, when the spindle guide 40 is slidden by actuating the spindle guide cylinder 907, the spline shaft 149 is slidden within the spline bush 150, and the turning force of the motor 27 is transmitted to the spindle 141.

SWITCHES, ETC.

Mounted on the side surface of one column guide 34 are a switch box 53 which contains various switches, and several manual feed apparatuses which include a saddle manual-feed apparatus 901, a table manual-feed apparatus 902 and a spindle guide/column guide manual-feed apparatus 903 [FIGS. 1(A) and 1(B)].

Cylindrical posts 62, 62 for encasing unshown balance weights are perpendicularly erected sideward of the columns 33, 33. One end of a chain 59 is fixed to the upper end of the corresponding one of the balance weights, while the other end thereof is fixed to the corresponding column guide 34 via a pulley 61 mounted on the upper surface of the corresponding post 62 and a pulley 60 mounted on the upper surface of the upper lid 35 placed at the upper end of the corresponding column 33 [FIG. 1(B)].

Accordingly, the balance weights and the total weight of the column guides 34, cross girder 37, spindle guide 40, etc. are distributively borne before and behind the columns 33, 33 and are balanced each other. Therefore, loads to be imposed on the column guide cylinders 908, 909 are relieved, and the column guides 34, 34 are smoothly moved in the vertical direction by actuating the column guide cylinders 908, 909.

In addition, an apparatus for sliding the saddle 38 horizontally is built in the cross girder 37.

Besides, cutting oil used in a cutting operation and chips appearing at that time fall on the table 31, and they are subsequently disposed of by cutting-oil disposers which are mounted on both the sides of the table 31 in the lengthwise direction thereof.

Figure 5A:
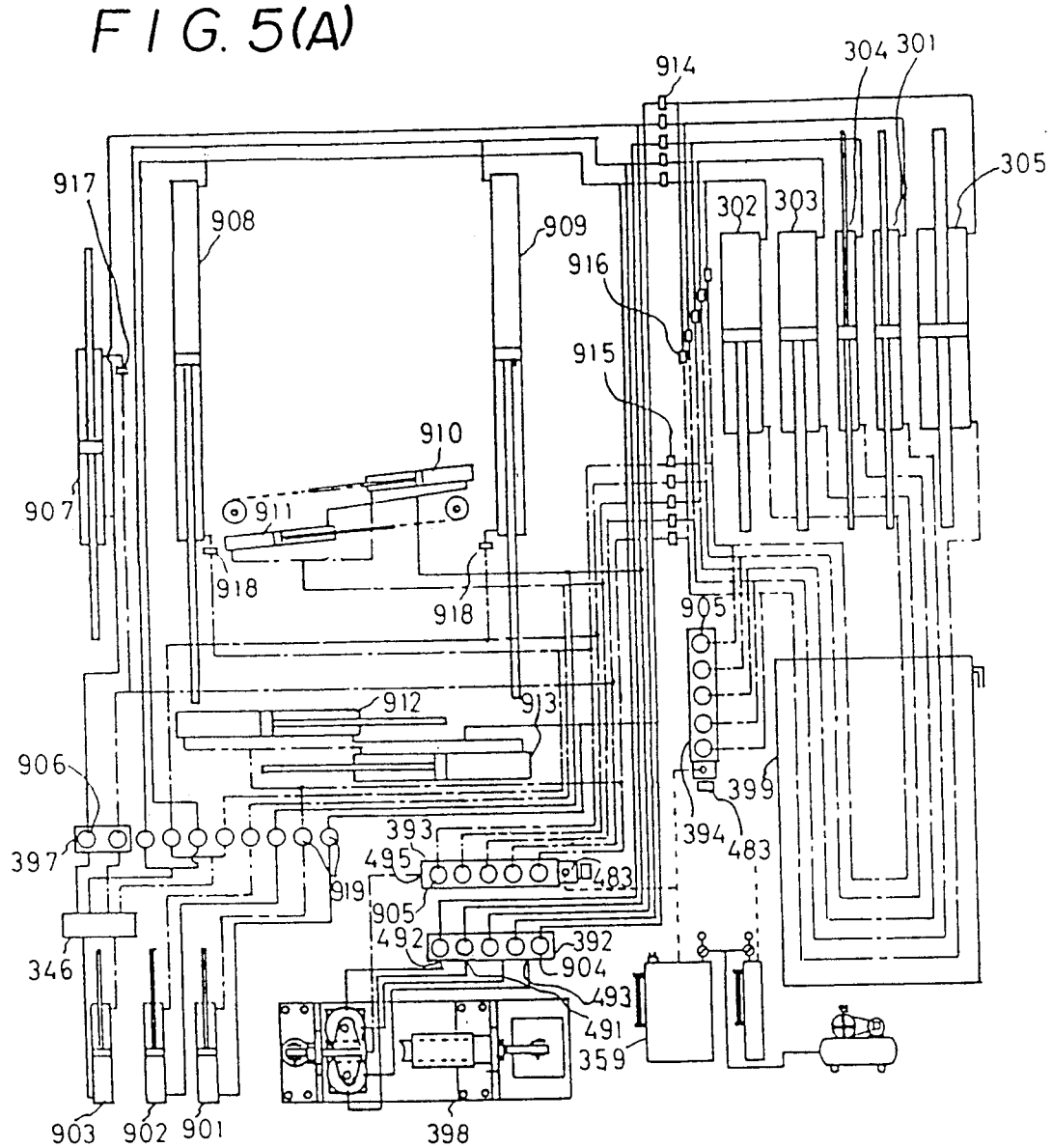
FIG. 5(A) is a piping diagram of an oil-pressure pipe arrangement.

A relief valve 917 is fixed to the support plate 41 [FIG. 1(A)] bolted to the upper end of the spindle guide 40 in such a manner that, as shown in FIG. 5(A), it is interposed in an oil supplying pipe laid to the spindle guide cylinder 907 for vertically moving the spindle guide 40.

Also, relief valves 918, 918, each of which has the same structure as that of the relief valve 917 and which are respectively mounted on the right and left ends of the upper surface of the trestle 36 [an upper part in FIG. 1(A)], are respectively interposed in oil supplying pipes laid to the column guide cylinders 908, 909 for vertically moving the column guides 34.

HYDRAULIC DRIVE MECHANISM

According to a hydraulic drive mechanism in this embodiment, three sorts of oil pressure sources for the double-acting drive cylinders 907-913, double-acting manual feed cylinders 801-803 and plunger pumps 410 are installed so as to be capable of multiple operations among them, as oil pressure sources which supply the pressure oil to the cylinders for actuating the reciprocatively movable members in the machine tool stated before.

Now, the three sorts of oil pressure sources will be described.

HYDRAULIC DRIVE SYSTEM (DRIVE CYLINDERS 907-913)

FIG. 4(A) shows the whole hydraulic drive system for supplying the pressure oil to the cylinders 907-913 referred to before.

Numeral 325 designates a framework which is formed of angle frames into the shape of a box, and in which an intermediate frame is transversely mounted on the intermediate part thereof. A gear box 326, a motor for driving and rotating the gear box 326 through reduction gears, and so forth are mounted at the bottom of the framework 325. A base frame 307 which forms an oil pan 374 open upwards [FIG. 4(B)] is mounted on the upper surface of the intermediate frame which overlies the gear box 326, four struts 308 are erected on the upper end surface of the base frame 307, and a cylinder frame 306 is fixed to the upper ends of the struts 308 [FIGS. 4(A)-4(C)].

Drive cylinders which consist of five double-acting cylinders serving as the oil pressure sources for the individual cylinders are fixed to the upper surface of the cylinder frame 306, and the primary chambers and secondary chambers of the drive cylinders are respectively held in communication with the primary and secondary chambers of the corresponding cylinders. More specifically, the spindle guide driving cylinder 301 as the oil pressure source corresponds to the spindle guide cylinder 907, the column guide driving cylinder 302 corresponds to the column guide cylinder 908, the column guide driving cylinder 303 corresponds to the column guide cylinder 909, the saddle driving cylinder 304 corresponds to the saddle cylinders 910, 911, and the table driving cylinder 305 corresponds to the table cylinders 912, 913 [FIGS. 4(A) and 4(C)].

FEED ROD AND FEED PLATE

Figure 4B:
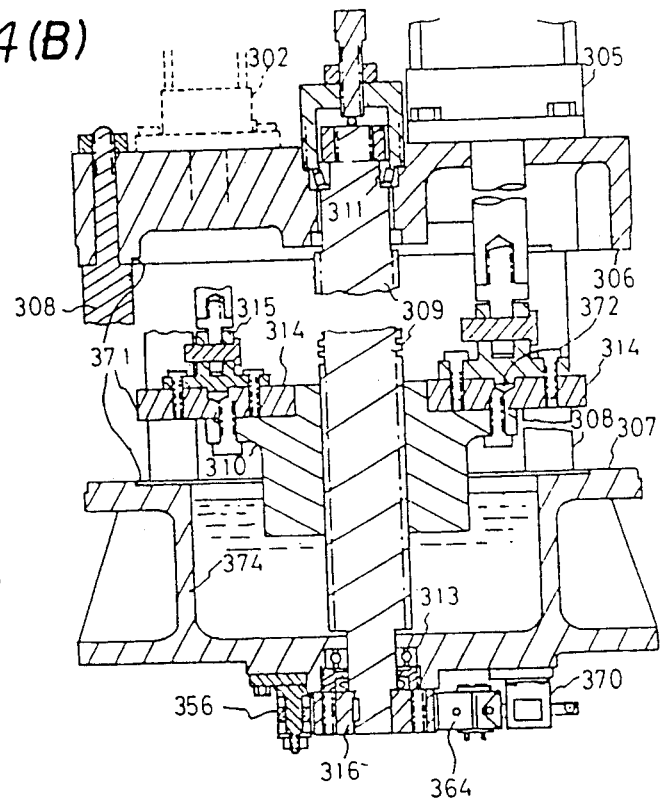
FIG. 4(B) is a sectional view of an oil pressure generation apparatus for hydraulic drive cylinders.

Referring to FIG. 4(B), the lower end of a feed rod 309 is journaled in a ball bearing 313 at the central position of the bottom surface of the base frame 307, while the upper end of the feed rod 309 is journaled in a slide bearing 311 at the central position of the cylinder frame 306. In addition, a feed plate 314 is mounted on a feed nut 310 held in threadable engagement with the feed rod 309, and the distal ends of the rods of the plurality of double-acting drive cylinders are turnably connected to the upper surface of the feed plate 314 by connection rods 315, respectively. When the feed rod 309 is rotated frontwards, the feed plate 314 ascends to push up the rods of the plurality of double-acting drive cylinders, so that the pressure oil is generated in the primary chambers of the respective drive cylinders. To the contrary, when the feed rod 309 is rotated reversely, the feed plate 314 descends, and the pressure oil is generated in the secondary chambers of the respective drive cylinders. Thus, the pressure oil is supplied into the primary chambers or secondary chambers of the corresponding cylinders.

Incidentally, since the base frame 307 forms the oil pan 374 open upwards, the rotation of the feed rod 309 allows lubricating oil in the oil pan 374 to rise along the feed rod 309, and the feed nut 310 is self-lubricated.

Further, a brake drum 316 is secured round the lower end of the feed rod 309, and it is provided with an electromagnetic brake 356 so as to be capable of stopping the rotation of the feed rod 309 suddenly. More specifically, when energized, a solenoid 370 brings a brake shoe 364, which is free to be contacted with or separated from the peripheral surface of the brake drum 316, into pressed contact with the brake drum 316 so as to stop the rotation of the feed rod 309 [FIGS. 4(B) and 4(L)].

GEAR BOX 326 AND ROTATION DRIVE MEANS

Referring to FIG. 4(A), the gear box 326 is fixed to the bottom of the framework 325 by bolts 330 [FIG. 4(H)], and an output shaft flange 373 formed at the front end of the output shaft of the gear box 326 is connected to the brake drum 316.

Referring to FIG. 4(D), a low speed side input shaft and a high speed side input shaft are horizontally protruded from the gear box 326. The low speed side input shaft is connected to the output shaft of reduction gears 327 through a clutch 328 as well as a rotor 329, and the reduction gears 327 are fixed to the framework 325 by bolts 375. A gear 331 is wedged to the input shaft of the reduction gears 327, while a sprocket 334 is wedged to the output shaft of a stepless transmission 333 fixed to the bottom of the framework 325, whereby these shafts are interlocked by a chain 332 which is wound over the gear 331 and the sprocket 334.

The input shaft of the stepless transmission 333 is interlocked with the output shaft of a brake motor 337 being low speed side drive means fixed to the bottom of the framework 325, through two-stage pulleys 335 and 336 and a V-belt [FIGS. 4(D) and 4(E)].

By the way, a rotor 339 is mounted on the high speed side input shaft through a bearing 377, and a clutch 340 which is free to be contacted with or separated from the side surface of the rotor 339 is wedged to the high speed side input shaft [FIG. 4(G)]. The rotor 339 is mounted so as to be capable of interlocking with a brake motor 344 being a high speed side driver [FIG. 4(A)] through a stepless transmission 341. This rotor 339 is interlocked through a chain 376 with a gear 342 which is wedged to the output shaft of the stepless transmission 341 fixed to the bottom of the framework 325 [FIG. 4(D)].

Herein, each of the brake motors 337 and 344 being the low speed side and high speed side drivers, respectively, [FIG. 4(A)]is a motor which is rotatable in both the frontward and reverse directions. The brake motors 337 and 344 are changed-over by the switches in FIG. 1(C).

CLUTCH CHANGE-OVER DEVICE

In order to prevent the turning forces of the low speed side driver and high speed side driver from acting simultaneously, the gear box 326 is provided with a device which changes-over the clutches 328 and 340 respectively mounted on the low speed side and high speed side input shafts of this gear box 326. The clutch change-over device will be described below in conjunction with FIGS. 4(G), 4(H) and 4(I).

SLIDE ROD

A slide rod 378 is slidably inserted through the through hole of a slide rod bracket 498 [FIG. 4(G)] mounted on the side surface of the gear box 326. A clutch fork 382 fixed to one end of the slide rod 378 by a nut 380 is connected to the clutch 328 of the low speed side input shaft, while a clutch fork 381 fixed to the other end of the slide rod 378 by a nut 380 is connected to the clutch 340 of the high speed side input shaft. In addition, the slide rod 378 is urged by springs 379, 379 so as to bring the clutch 328 away from the friction surface of the rotor 329 wedged to the low speed side input shaft and also to bring the clutch 340 away from the friction surface of the rotor 339 mounted on the high speed side input shaft [FIG. 4(G)].

A slot is provided in the lengthwise direction of the through hole of the slide rod bracket 498, and a pin 386 protruded from the slide rod 378 is inserted through the slot [FIG. 4(G)].

ROCKER

On the other hand, a T-shaped rocker 384 protrusively provided on the side wall surface of the gear box 326 is secured by a pin 385 [FIG. 4(H)], and the pin 386 of the slide rod 378 engages a slot provided in the central end of the rocker 384. In addition, through holes are provided in the right and left ends of the rocker 384, the front ends of the rods 387, 387 of solenoids 338, 345 are respectively inserted through the through holes, and springs 388, 388 are respectively retained at the protruding ends of the rods 378, 378, thereby urging the right and left parts of the rocker 384 so as to turn them in directions opposite to each other [FIGS. 4(H) and 4(I)].

Accordingly, ordinarily the turning forces of the low speed side and high speed side drivers are not transmitted to the low speed side and high speed side input shafts of the gear box 326, respectively. However, when one solenoid 338 (or 345) is operated, one clutch 328 (or 340) is applied to transmit the turning force of one driver to one input shaft of the gear box 326. By way of example, when the solenoid 345 corresponding to the high speed side input shaft is energized, the rod 387 of this solenoid 345 pulls down the left end of the rocker 384 through the spring 388. Then. the rocker 384 is turned counterclockwise in FIG. 4(H) with the pin 385 as a fulcrum. Therefore, the pin 386 engaging the slot in the central end of the rocker 384 is moved, and the slide rod 378 is moved rightwards [FIG. 4(G)].

In consequence, the clutch 340 connected to the clutch fork 381 mounted on the end of the slide rod 378 is brought into pressed contact with the friction surface of the rotor 339, and the turning force from the high speed side driver as transmitted to the rotor 339 is transmitted to the high speed side input shaft of the gear box 326. Simultaneously, the low speed side clutch 328 is moved away from the friction surface of the rotor 329, so that the turning force from the low speed side driver is not transmitted to the low speed side input shaft of the gear box 326.

Incidentally, the adjustments of the springs 388, 388 urging the right and left arm ends of the rocker 384 downwards are very important because these springs change the position of the slide rod 378 in the lateral direction thereof delicately.

The motors of the high speed side and low speed side drivers are driven to rotate by turning ON a power switch 19 [FIG. 1(C)]. By way of example, a low speed switch 2 is thrown onto its frontward rotation side, while a high speed switch 1 is thrown onto its reverse rotation side, and the solenoid 338 corresponding to the low speed side driver is energized. In this case, the turning force of the brake motor 337 is transmitted to the low speed side input shaft of the gear box 326, and the feed rod 309 connected to the output shaft flange 373 of the gear box 326 is rotated frontwards. Then, the feed rod 309 raises the feed plate 314 to push up the rods of the drive cylinders 301 - 305 connected to the upper surface of the feed plate 314, and the pressure oil is generated in the primary chambers of these drive cylinders and is fed under pressure into the primary chambers of the corresponding cylinders.

To the contrary, when the solenoid 345 corresponding to the high speed side driver is energized, the reverse turning force of the brake motor 344 rotates the feed rod 309 reversely and lowers the feed plate 314. Therefore, the rods of the drive cylinders 301 -305 are lowered, and the pressure oil is generated in the secondary chambers of these drive cylinders and is fed under pressure into the primary chambers of the corresponding cylinders.

MEANS FOR SENSING UPPER LIMIT AND LOWER LIMIT OF HYDRAULIC DRIVE CYLINDERS

Referring to FIGS. 4(A) and 4(J), the lower end and intermediate position of a guide bar 319 are respectively fixed to the two places of a bracket 317 mounted on the cylinder frame 306 and a bracket 318 mounted on the base frame 307, and the upper end side of the guide bar 319 is extended above the bracket 317. Besides, two switch guides 321, 322 are fixed to the part of the guide bar 319 between the brackets 317 and 318 by set bolts 389 so as to have an appropriate spacing between these switch guides and to be adjustably movable. Limit switches 391, 391 are respectively secured to the switch guides 321, 322 [FIG. 4(J)].

Figure 4C:
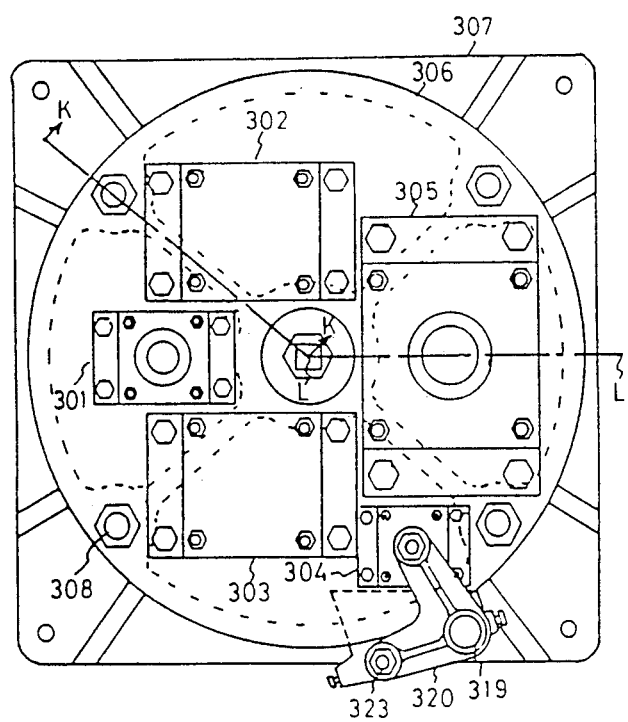
FIG. 4(C) is a plan view corresponding to FIG. 4(A)

One end of an L-shaped guide device 320 slidably fitted on the upper end side of the guide bar 319 is fixed to the distal end of the upper rod of the saddle driving cylinder 304 of the double-sided rod type installed on the upper surface of the cylinder frame 306 [FIG. 4(C)]. and a lever 323 [FIG. 4(J)] is mounted under the other end of the guide device 320 so as to extend in parallel with the guide bar 319. The lever 323 is inserted through a through hole provided in the bracket 317, and a block 324 is mounted on the front end of the lever 323 so as to be capable of pressing the two limit switches 391. 391 [FIG. 4(J)].

When either of the limit switches 391, 391 is pressed by the block 324, a detection signal is generated. The detection signal changes-over the start and stop operations of the brake motor 344 of the high speed side driver [FIG. 4(A)] or the brake motor 337 of the low speed side driver [FIG. 4(D)], while at the same time, it energizes either of the solenoids 338, 345 of the clutch change-over device [FIG. 4(H)].

A high/low speed switch 14 and a high/low speed motor change-over switch 20 [FIG. 1(C)] are switches capable of various change-over operations. When these switches are operatively combined, it is possible by way of example to raise the feed plate 314 with the brake motor 337 of the low speed side driver, and to lower the feed plate 314 with the brake motor 344 of the high speed side, or vice versa. It is also possible to use the brake motor 337 of the low speed side or the brake motor 334 of the high speed side for both the ascent and descent of the feed plate 314. Incidentally, how to energize the solenoid 338 or 345 of the clutch change-over device depends upon the change-over operations of the individual switches.

As an example, there will be explained a case of setting where the ascent of the feed plate 314 is effected by the low speed side brake motor 337, while the descent thereof is effected by the high speed side brake motor 344.

The feed plate 314 is raised by the frontward rotation of the brake motor 337, the lever 323 [FIG. 4(J)] is raised with the ascent of the upper rod of the saddle driving cylinder 304, and the upper limit switch 391 is pressed by the block 324. Then, the detection signal of this limit switch 391 stops the rotation of the low speed side brake motor 337 and starts the high speed side brake motor 344. Simultaneously, the detection signal of the limit switch 391 energizes the solenoid 345 of the clutch change-over device. Therefore, the rotating direction of the feed rod 309 is changed-over from the direction of raising the feed plate 314 to the direction of lowering it. On the other hand, when the lower limit switch 391 is depressed, the situation is converse to the above, and the rotating direction of the feed rod 309 is changed-over from the direction of lowering the feed nut 310 to the direction of raising it. In this way, the drive cylinders are reciprocatively operated, and the pressure oil is generated alternately in the primary chambers and the secondary chambers of the drive cylinders.

MANUAL FEED APPARATUSES (MANUAL FEED CYLINDERS 801 -803)

Referring to FIG. 1(A), the three sorts of manual feed apparatuses 901, 902, 903 disposed sideward of the column guide 34 have the same structures. The apparatus 901 serves to reciprocate the saddle 38 laterally as viewed in the sheet of FIG. 1(A) along the sliding portion of the cross girder 37, the apparatus 902 serves to reciprocate the table 31 in the lengthwise direction of the bed 30 along the sliding portion of the bed 30, and the apparatus 903 serves to reciprocate the spindle guide 40 vertically within the spindle head 39 or the column guides 34 vertically along the columns 33 by the use of an electromagnetic valve 346 [FIG. 5(A)].

STRUCTURES OF MANUAL FEED APPARATUSES

Figure 3D:
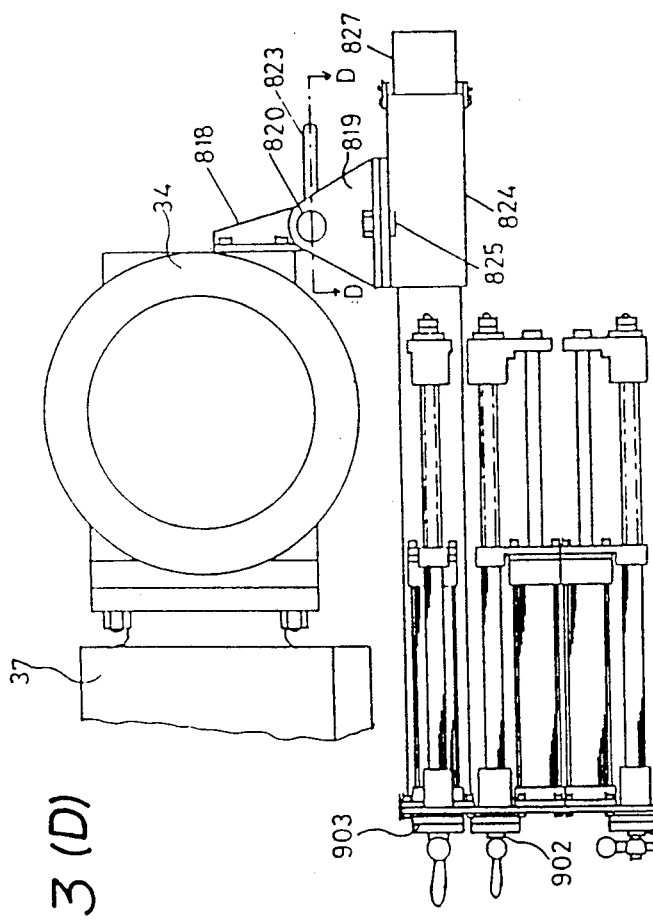
FIG. 3(D) is a plan view corresponding to FIG. 3(B)

The saddle manual-feed apparatus 901 shown in FIGS. 3(A) and 3(F) will be described below. Since the other manual feed apparatuses 902, 903 are similar, they shall be omitted from description.

Figure 3E:
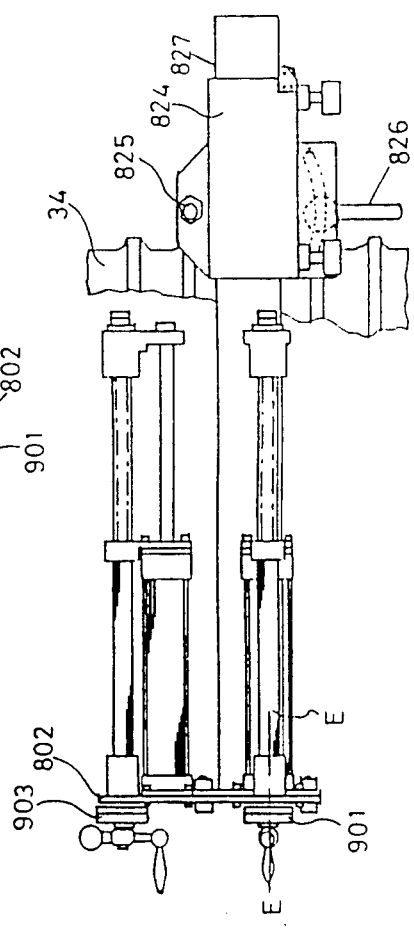
FIG. 3(E) is a side view corresponding to FIG. 3(D)
Figure 3F:
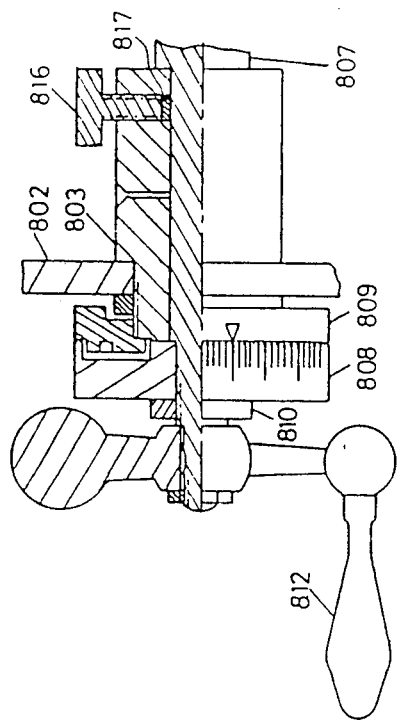
FIG. 3(F) is a sectional view of the essential portions of a handle in FIG. 3(A)

A manual feed cylinder 801 is constructed of a double-acting cylinder, and it is mounted on the back surface of a cylinder plate 802 with its lengthwise direction held identical to the sliding direction of the frame 827 [FIG. 3(E)]. Besides, a feed screw 807 is journaled in a bearing 803 mounted on the cylinder plate 802 and a bearing 805 mounted on the manual feed cylinder 801. A handle 812 [FIG. 3(F)] is fixed to the front end of the feed screw 807 protruded on the front surface side of the cylinder plate 802.

When the handle 812 is rotated clockwise, a guide section 806 held in threadable engagement with the threaded portion of the feed screw 807 on the rear end side thereof moves the feed screw 807 leftwards in FIG. 3(A), and it moves in the same direction that distal end of the rod of the manual feed cylinder 801 to which one end of the guide section 806 is fixed by a bolt 804. Owing to the movement of this rod, the pressure oil is generated in the primary chamber of the manual feed cylinder 801, and it is fed into the primary chambers of the saddle cylinders 910, 911 communicating with the primary chamber of the cylinder 801, thereby to move the saddle 38 leftwards as viewed in FIG. 1(A). On this occasion, the saddle 38 can be precisely moved to a desired position in such a way that an operator turns the handle 812 while watching an annular scale plate 808 fixed to the feed screw 807 by a nut 810 and an indication plate 809 provided for indicating the graduation of the scale plate 808 [FIG. 3(F)].

Incidentally, since the rod of the manual feed cylinder 801 is urged toward its distal end through a spring 811, the guide section 806 located at the distal end of the rod is normally urged toward the rear end of the feed screw 807. Therefore, the backlash between the threads of the guide section 806 and the feed screw 807 lessens, and the oil pressure in the manual feed cylinder 801 can be adjusted delicately.

On the other hand, when the handle 812 is rotated counterclockwise, the pressure oil is generated in the secondary chamber of the manual feed cylinder 801, and it is fed into the secondary chambers of the saddle cylinders 910, 911 communicating with the secondary chamber of the cylinder 801. By the way, a washer 817 made of brass is inserted into a through hole provided in the peripheral surface of the bearing 803 in such a manner that it can be pressed against the feed screw 807 by the front end of a setscrew 816 threadably mounted in the through hole [FIG. 3(F)]. Accordingly, when the setscrew 816 is tightened, the rotation of the feed screw 807 is stopped, and the saddle 38 is kept stopped at the desired position.

STRUCTURE FOR MOUNTING MANUAL FEED APPARATUSES ON COLUMN GUIDE

A structure for mounting the manual feed apparatuses 901, 902, 903 on the column guide 34 will be described. Referring to FIGS. 3(C) and 3(D), a bracket 818 is fixed to the side surface of the column guide 34, and an arm 819 is secured to the bracket 818 by a pin 820 so as to be horizontally turnable. The arm 819 can be fixed to the bracket 818 or freed to turn in such a way that the operator grips and turns a lever 823.

In addition, the arm 819 is provided with a vertical flange surface, to which a box 824 has its upper end fastened by a pin 825 so as to be vertically turnable [FIGS. 3(C) and 3(E)]. Herein, when a lever 826 provided under the vertical flange surface of the arm 819 is turned in the tightening direction thereof, the box 824 is fixed to the vertical flange surface of the arm 819, and when the lever 826 is loosened, the box 824 is permitted to turn in the vertical direction.

Incidentally, since a slot of circular arc shape in the arm 819 is provided over an angle of 80 degrees about the pin 825, the box 824 can be inclined 40 degrees in each of rightward and leftward directions from the vertical state thereof.

The frame 827 having a square section is disposed inside a through hole provided in the box 824, so as to be horizontally movable, and a cylinder plate 802 for mounting all the manual feed apparatuses 901, 902, 903 and the switch box 53 is attached to one end of the frame 827 [FIGS. 3(B) - 3(E)].

ELECTROMAGNETIC PRESSURE-OIL SUPPLY APPARATUS AND VARIOUS SOLENOID VALVES

Figure 5B:
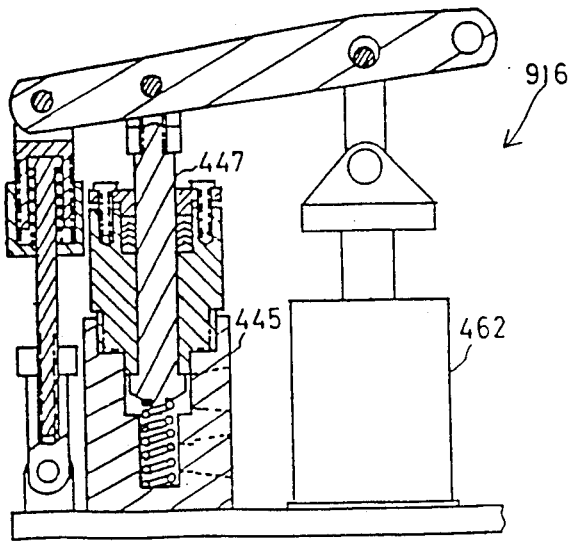
FIG. 5(B) is a sectional view of a drive-cylinder transfer valve.
Figure 5C:
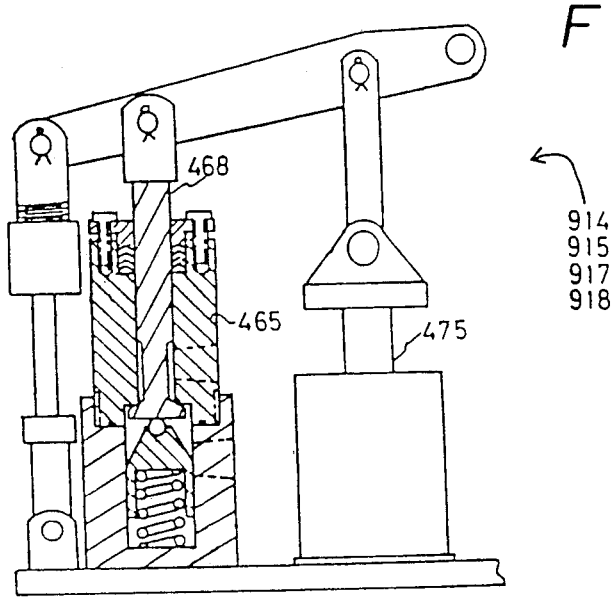
FIG. 5(C) is a vertical sectional view of each of primary-chamber and secondary-chamber transfer valves and relief valves.
Figure 5D:
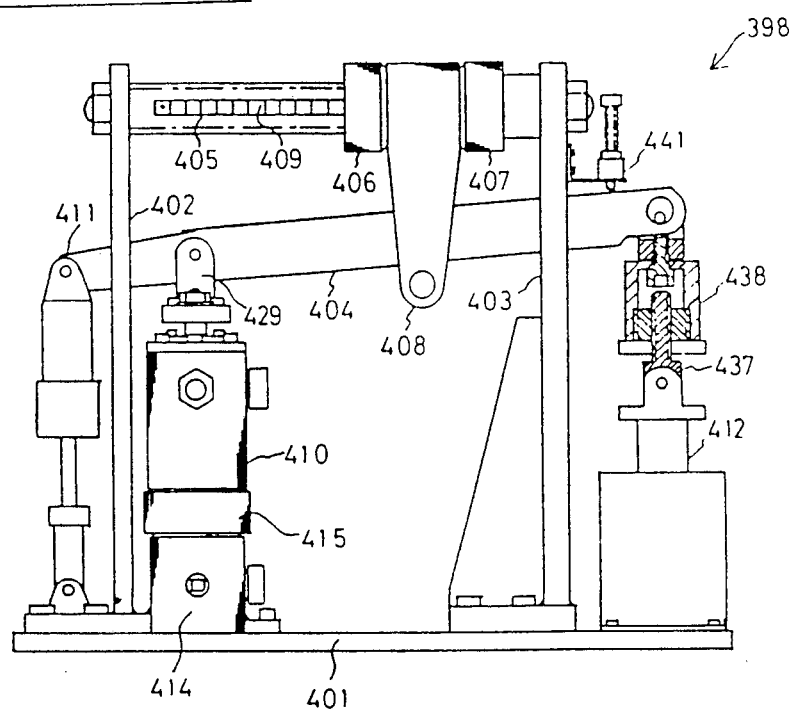
FIG. 5(D) is a front view of an electromagnetic pressure-oil supply apparatus.

Referring to FIGS. 5(D), 5(G) and 5(I), an electromagnetic pressure-oil supply apparatus 398 is such that two struts 402, 403 are erected on a base 401 and that a scale bar 405 is transversely extended between the upper ends of the struts 402, 403. The side wall surfaces of the struts 402, 403 are respectively provided with vertically-long cutouts below the positions thereof for mounting the scale bar 405, and a pump lever 404 is fitted in these cutouts.

One end of the pump lever 404 is turnably connected through adjusting bolts 437, 438 to the distal end of the rod of a solenoid 412 which is fixed to the base 401. The other end of the pump lever 404 is turnably connected to the distal end of a supporter 411 which is fixed to the base 401. In addition, two plunger pumps 410 are juxtaposed on the base 401 below the pump lever 404 and with appropriate spacings from the solenoid 412 [FIG. 5(I)].

The pump lever 404 is adjusted as follows: A slide bracket 408 slidably mounted on the scale bar 405 is moved to the desired position of a scale 409 formed on the scale bar 405, and it is fixed by clamping both its ends by the use of two nuts 406, 407 held in threadable engagement with the scale bar 405. Subsequently, the nut 438 at the distal end of the rod of the solenoid 412 is rotated to vertically move one end of the pump lever 404 so that the lower surface of the pump lever 404 may abut against the fulcrum pin 443 of the slide bracket 408. Incidentally, the pump lever 404 can be finely adjusted by moving the lower end of an adjusting bolt 441 which is mounted on the side wall surface of the strut 403 so as to be adjustably movable.

When energized, the solenoid 412 pulls one end of the pump lever 404 downwards. Then, since the lower surface of the pump lever 404 is held in abutment against the fulcrum pin 443 inserted in the lower end of the slide bracket 408 [FIGS. 5(D).and 5(L)], the pump lever 404 swivels in seesaw fashion with a fulcrum at the fulcrum pin 443 and pulls up an arm 429 connected to the other end side of this pump lever 404. Thus, the rods 419' of the two plunger pumps 410 connected to both the ends of the arm 429 through connection rods 429' are pulled upwards, and the pressure oil is generated in the primary chambers of the two plunger pumps 410 to be described later.

PLUNGER PUMPS 410

The internal structure of each of the plunger pumps 410 is such that a cylinder base 415 [FIG. 5(H)] is threadably mounted on the upper surface of a base block 414 fixed to the base 401 [FIG. 5(D)], that a pump body 417 is mounted on the upper surface of the cylinder base 415, and that a piston 419 and a piston guide 420 joined to the piston 419 are provided in the pump body 417 so as to be unitarily slidable.

Two piston rings 423 are snugly fitted on the outer peripheral surface of the piston 419, while an oil pressure packing 424 is snugly fitted on the outer peripheral surface of the piston guide 420. The primary chamber (discharge chamber) and a secondary chamber (suction chamber) are defined in the cylinder of the pump body 417. A discharge port is provided in the upper end of the primary or discharge chamber, and a through hole being a suction port is provided in the lower end of the secondary or suction chamber, in other words, centrally of the upper surface of the cylinder base 415. An oil supply hole communicating with the above through hole is provided in the side surface of the base block 414.

The piston 419 has the rod 419' extending upwards in the upper cylinder chamber. A valve chamber is defined centrally of the junction plane between the lower surface of the piston 419 and the upper surface of the piston guide 420. A hole communicating with the valve chamber and the primary chamber (discharge chamber), and a hole communicating with the valve chamber and the secondary chamber (suction chamber) are respectively provided in the piston 419 and the piston guide 420. Besides, a valve seat is formed at the bottom of the valve chamber, and a ball 422 abutting on the valve seat is depressed by a spring 421 in a manner to be capable of opening the valve seat.

The upper surface of the pump body 417 is blocked up by a rod guide 425 in the shape of a flat board. The rod 419' of the piston 419 is passed through a hole provided in the plunger guide 425, and has its distal end protruded upwards. Incidentally, a packing 426 is mounted on the upper surface of the rod guide 425 in sliding contact with the peripheral surface of the rod 419' of the piston 419, and it is fixed by a packing gland 428, so that the interior of the plunger pump 410 is held airtight.

The piston 419 as well as the piston guide 420 is normally urged toward the cylinder base 415 by a spring 413 which is interposed between the piston 419 and the rod guide 425 [FIG. 5(H)].

The discharge port of the primary chamber of the plunger pump 410 is held in communication with the primary chamber of the cylinder for actuating the reciprocatively movable member, while the suction port of the secondary chamber of the plunger pump 410 is held in communication with the secondary chamber of the cylinder.

When the rod 419' of the piston 419 is pushed upwards in the plunger pump 410, working oil in the primary chamber (discharge chamber) of this plunger pump is pushed up by the piston 419 to generate pressure oil, because the ball 422 depressed on the valve seat of the valve chamber in the illustration of FIG. 5(H) functions as a check valve. The pressure oil thus generated is fed under pressure from the discharge port into the primary chamber of the actuating cylinder to the amount of the stroke of the piston 419. Simultaneously, pressure oil is generated in the secondary chamber of the actuating cylinder. This pressure oil is fed toward the secondary chamber of the plunger pump 410. Herein, when the solenoid 412 is turned OFF, the piston 419 and the piston guide 420 are pushed downwards by the spring 413. Simultaneously, the pressure oil fed toward the secondary chamber (suction chamber) pushes up the ball 422 against the urging force of the spring 421 and flows into this secondary chamber (suction chamber) through the communicating hole of the piston 419.

When the solenoid 412 is turned ON again, the operating steps described above proceed, and a preset quantity of pressure oil is fed under pressure from the discharge port of each of the two plunger pumps 410 into the primary chamber of the actuating cylinder.

The pressure oil of the electromagnetic pressure-oil supply apparatus 398 is fed into the primary chamber(s) of one cylinder (or more cylinders) desired to be operated among the cylinders connected to the individual movable members, in such a way that manual valves 904 and manual valves 905 respectively arranged in a primary-chamber manual valve kit 392 and a secondary-chamber manual valve kit 393 to be described later are manipulated to open or close. Thus, a reciprocating motion for, e. g., cutting of preset magnitude is carried out. The pressure oil in the secondary chamber(s) of the operated cylinder(s) is fed back to and recovered by the electromagnetic pressure-oil supply apparatus 398.

The supporter 411 is as shown in FIG. 5(G). A lid 435 in the shape of a cylinder open upwards is threadably mounted round a supporting box 436 in the shape of a cylinder open at its lower end. The bottom of the lid 435 is provided with a through hole, through which a supporting rod 432 is passed. Herein, the lid 435 and the supporting box 436 are urged downwards through a spring 433 which is retained at one end by the lower surface of a flange formed at the upper end of the supporting rod 432. In addition, a nut 431 is turnably connected to the bracket 430 of the base 401, and the lower end of the supporting rod 432 is threadably mounted in the upper end of the nut 431. Meanwhile, the upper end of the supporting box 436 is turnably connected to one end of the pump lever 404 (indicated by hatching in FIG. 5(H)).

Accordingly, when the solenoid 412 is energized to lower one end of the pump lever 404, the supporting box 436 of the supporter 411 [FIG. 5(G)] connected to the other end of the pump lever 404 is pulled upwards. Then, the bottom of the lid 435 threadably mounted on the lower end of the supporting box 436 is pulled up against the downward urging force of the spring 433 held in engagement with the flange surface at the distal end of the supporting rod 432. The upper limit of the pull-up movement is reached when the spring 433 is completely compressed. [FIG. 5(G)]

When the supporting box 436 arrives at its upper limit as stated above before the arrival of the rod of the solenoid 412 at the lower-limit position thereof, the rod of the solenoid 412 does not move downwards any longer. This state corresponds to the upper limit of the stroke of the plunger pump 410. Accordingly, the upper limit of the stroke of the plunger pump 410 can be adjusted in such a way that the distance between the internal upper surface of the cylinder of the supporting box 436 and the bottom of the lid 435 is adjusted by rotating the lid 435.

The distance between the fulcrum pin 443 and the solenoid 412 and the distance between the fulcrum pin 443 and each plunger pump 410 are changed by shifting the slide bracket 408 laterally in FIG. 5(D) and setting it at the desired graduation of the scale 409 of the scale bar 405. Therefore, the stroke of the plunger pump 410 is changed in accordance with the principle of the lever, and the quantity of the pressure oil to be fed from the plunger pump 410 is changed.

VARIOUS CYLINDER TRANSFER VALVES

Primary-chamber transfer valves 914, secondary-chamber transfer valves 915 and the relief valves 917, 918 have structures similar to one another as shown in FIG. 5(C). In each of these valves, the valve seat of a valve chamber in a valve casing 465 is normally closed by a valve stem 468. When a solenoid 475 is energized, the valve stem 468 comes away from the valve seat to open this valve seat, so that an oil supplying port and an oil draining port which are provided in the valve chamber are brought into communication.

Besides, each of drive-cylinder transfer valves 916 is as shown in FIG. 5(B). The valve seat of a valve chamber in a valve casing 445 is normally let open by a valve stem 447. When a solenoid 462 is energized, the valve stem 447 abuts against the valve seat to close this valve seat, so that an oil supplying port and an oil draining port which are provided in the valve chamber are cut off.

MANUAL VALVE KITS 392, 393, 394

The primary-chamber manual valve kit 392 includes the manual valves 904 numbering five, the secondary-chamber manual valve kit 393 includes the manual valves 905 numbering five, and an oil supply valve kit 394 includes manual valves 905 numbering five. The manual valves of each kit are held in communication through oil holes [FIGS. 5(A), 5(E) and 5(F)].

MANUAL VALVES 904, 905

The manual valves 904 will be described below, and the manual valves 905 having he same structure shall be omitted from description. Referring to FIG. 5(I), the manual valve 904 is such that oil holes adapted to communicate with a valve chamber in a valve casing 479 are respectively provided in the bottom surface and side surface of the valve casing 479, and that a ball separably contacted with a valve seat in the valve chamber is included and urged by a spring so as to come away from the valve seat. A valve rod 478 furnished with a handle 484 at its upper end is threadably mounted on the valve casing 479 so as to be vertically movable, and the lower end of the valve rod 478 abuts against the apex of the ball in the valve chamber.

With the manual valve 904, accordingly, the valve seat is closed when the valve rod 478 is tightened by rotating the handle 484, and the valve seat is opened when the valve rod 478 is loosened.

PRIMARY-CHAMBER MANUAL VALVE KIT 392

Figure 5E:
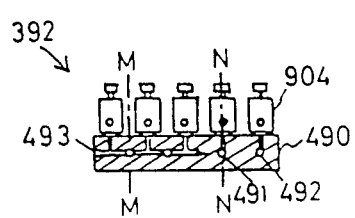
FIG. 5(E) is a front view of a primary-chamber manual valve kit.

Referring to FIG. 5(E), the primary-chamber manual valve kit 392 is such that the five manual valves 904 are threadably mounted on a base block 490. Two of the five manual valves 904 have their bottom oil holes respectively and individually held in communication with the coupling portions 491, 492 of oil supplying ports which are provided in the side surface of the base block 490. The remaining three manual valves 904 have their bottom oil holes held in communication with one another by an oil hole provided in the base block 490, and also held in communication with the coupling portion 493 of an oil supplying port provided in the side surface of the base block 490.

Herein, the coupling portions 491, 492, 493 of the primary-chamber manual valve kit 392 are respectively held in communication with the oil draining ports of the primary chambers of the electromagnetic pressure-oil supply apparatus 398 through pipes as illustrated in FIG. 5(A). Thus, the manual valve 904 communicating with the coupling portion 491 and the manual valve 904 communicating with the coupling portion 492 are respectively held in communication with the primary chambers of the column guide cylinders 908 and 909 through the pipes. Further, the three manual valves 904 communicating with the coupling portion 493 are respectively held in communication with the spindle guide cylinder 907, the saddle cylinders 910, 911 and the table cylinders 912, 913 through the pipes.

SECONDARY-CHAMBER MANUAL VALVE KIT 393 AND OIL SUPPLY VALVE KIT 394

The secondary-chamber manual valve kit 393 and the oil supply valve kit 394 have similar structures. Therefore, the secondary-chamber manual valve kit 393 will be described below, and the oil supply valve kit 394 shall be omitted from description.

Figure 5F:
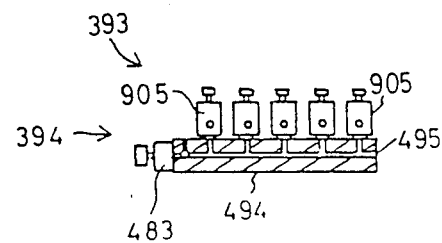
FIG. 5(F) is a front view of each of a secondary-chamber manual valve kit and an oil supply valve kit.

Referring to FIG. 5(F), the secondary-chamber manual valve kit 393 is such that the five manual valves 905 are threadably mounted on a base block 494. All the manual valves 905 have their bottom oil holes held in communication with one another by an oil hole provided in the base block 494, and also held in communication with the coupling portion 495 of an oil supplying port provided in the side surface of the base block 494.

A manual valve 483 having the same structure as that of the manual valve 904 is threadably mounted on the side surface of the base block 494 [FIG. 5(I)], and an oil hole in the bottom of this manual valve 483 is held in communication with the oil holes of the manual valves 905.

Herein, the five manual valves 905 of the secondary-chamber manual valve kit 393 are respectively held in communication with the secondary chamber of the spindle guide cylinder 907 via the relief valve 917, the secondary chamber of the column guide cylinder 908 via the relief valve 918, the secondary chamber of the column guide cylinder 909 via the relief valve 918, the secondary chambers of the saddle cylinders 910, 911, and the secondary chambers of the table cylinders 912, 913, through pipes as illustrated in FIG. 5(A). Besides, the coupling portion 495 communicating with the bottom oil holes of the five manual valves 905 is held in communication with the oil supplying ports of the secondary chambers of the electromagnetic pressure-oil supply apparatus 398 through pipes.

In addition, the manual valve 483 of the secondary-chamber manual valve kit 393 is held in communication with a lubricating oil pressure tank 359.

Meanwhile, as illustrated in FIG. 5(A), the five manual valves 905 of the oil supply valve kit 394 are respectively held in communication with the secondary chambers of the spindle guide driving cylinder 301, column guide driving cylinders 302 and 303, saddle driving cylinder 304 and table driving cylinder 305 in the hydraulic drive system [FIGS. 4(A) and 4(C)] through pipes, and the manual valve 483 [FIGS. 5(A) and 5(F)] communicating with the bottom oil holes of the five manual valves 905 is held in communication with the lubricating oil pressure tank 359. Incidentally, the oil supply valve kit 394 is not provided with a portion corresponding to the coupling portion 495 [FIG. 5(F)]of the secondary-chamber manual valve kit 393.

The manual valves 483, which are provided in the secondary-chamber manual valve kit 393 and the oil supply valve kit 394, are used for supplying or replenishing the cylinders and pipes with oil fed under pressure from the lubricating oil pressure tank 359. They are also used for venting air in the pipes when the hydraulic pipes are assembled or when any of the pipes leaks.

OPERATIONS OF HYDRAULIC PIPE MECHANISM AND DRIVING HYDRAULIC MECHANISM

HYDRAULIC PIPE MECHANISM

FIG. 5(A) shows a pipe arrangement diagram of the hydraulic pipe mechanism of the whole hydraulic drive system. The upper cylinders (primary chambers) of the drive cylinders 301-305 of the hydraulic drive system are respectively held in communication with the primary chambers of the corresponding cylinders 907-913 via the primary-chamber transfer valves 914 by the pipes.

More specifically, the spindle guide driving cylinder 301 is held in communication with the spindle guide cylinder 907 via the primary-chamber transfer valve 914, the column guide driving cylinder 302 with the column guide cylinder 908, the column guide driving cylinder 303 with the column guide cylinder 909, the saddle driving cylinder 304 with the saddle cylinders 910 and 911, and the table driving cylinder 305 with the table cylinders 912 and 913.

The secondary chambers of the drive cylinders 301, 302, 303, 304, and 305 are respectively held in communication with the secondary chambers of the corresponding cylinders 907, 908, 909, 910 and 911, and 912 and 913 via the secondary-chamber transfer valves 915 by the pipes. The relief valve 917 is connected to the secondary chamber of the spindle guide cylinder 907, and the relief valves 918 are respectively connected to the secondary chambers of the column guide cylinders 908, 909.

In addition, the pipes laid between the primary chambers of the drive cylinders 301, 302, 303, 304, 305 and the primary-chamber transfer valves 914 and the pipes laid between the secondary chambers of the same drive cylinders and the secondary-chamber transfer valves 915 are respectively connected through the drive-cylinder transfer valves 916.

By the way, a table switch 3, a saddle switch 4, a column guide switch 5, and a spindle guide switch 6, which are provided in the switch box 53 [FIGS. 1(A) and 1(C)], are electrically connected to the primary-chamber transfer valves 914, secondary-chamber transfer valves 915 and drive-cylinder transfer valves 916 associated with the corresponding drive cylinders 305, 304, 302 and 303, and 301, respectively. When any of the plurality of switches 3, 4, 5 and 6 is turned ON, the other switches turn OFF.

Accordingly, when the table switch 3 is turned ON by way of example [FIG. 1(C)], the primary-chamber transfer valve 914 and secondary-chamber transfer valve 915 of the table driving cylinder 305 [FIG. 5(A)] are energized by the solenoids 475 [FIG. 5(C)] and are opened, and the drive-cylinder transfer valve 916 interposed between the primary and secondary chambers of the table driving cylinder 305 is energized by the solenoid 462 [FIG. 5(B)] and is closed. On this occasion, the primary-chamber transfer valves 914, secondary-chamber transfer valves 915 and drive-cylinder transfer valves 916 of the other drive cylinders 301, 302, 303 and 304 are not energized. Among them, the primary-chamber transfer valves 914 and the secondary-chamber transfer valves 915 are kept closed, whereas the drive-cylinder transfer valves 916 are kept open [FIG. 5(A)].

Figure 7A:
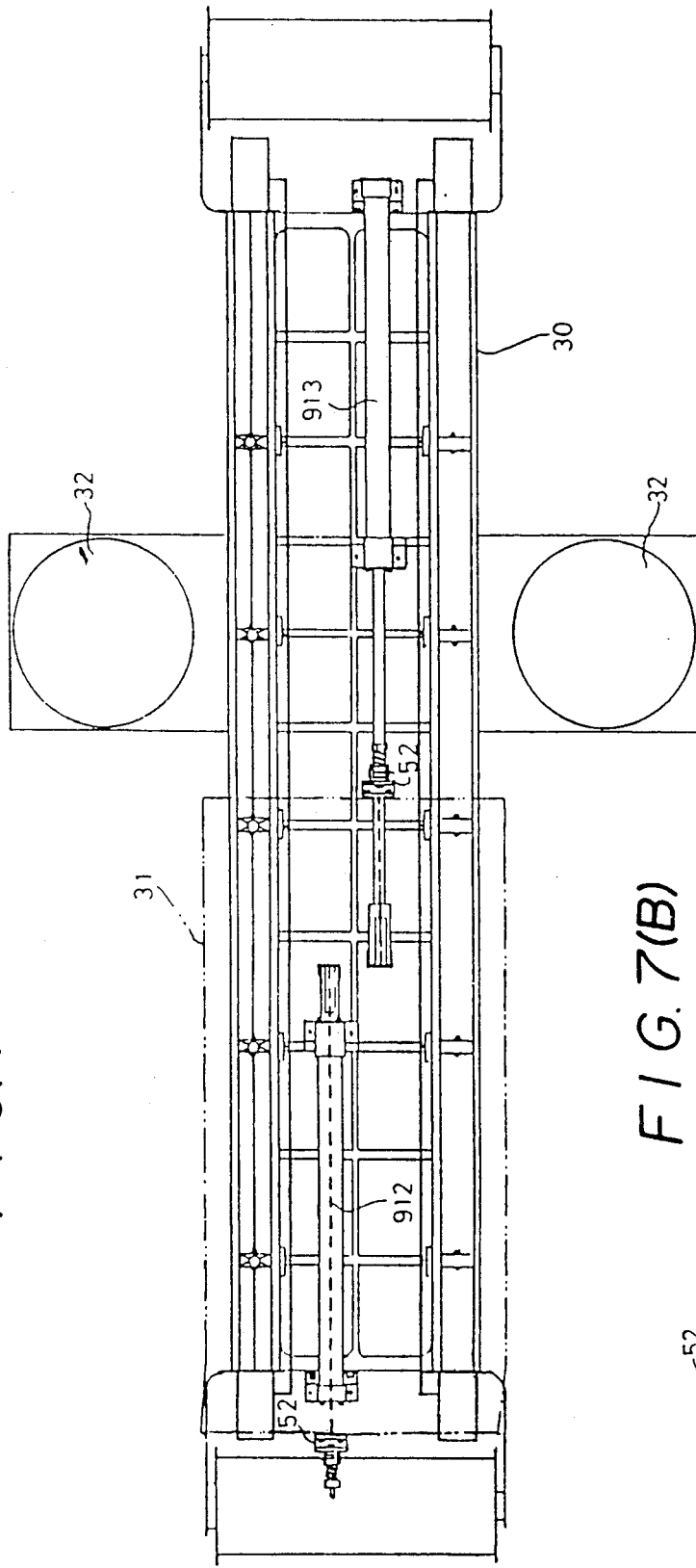
Figure 7B:
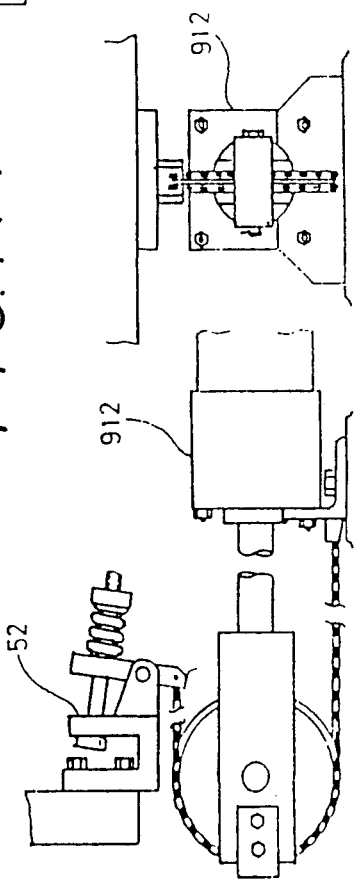
FIG. 7(B) shows a front view and a side view of the essential portions of a table actuating mechanism.

Accordingly, when the feed rod 309 is rotated to raise the feed plate 314 [FIGS. 4(A) and 4(B)], the pressure oil of the primary chamber of the table driving cylinder 305 is fed into the primary chambers of the table cylinders 912, 913 after passing through the primary-chamber transfer valve 914, and the table 31 is moved leftwards as viewed in FIG. 1(B) or FIG. 7(A), by the operations of the rods of the table cylinders 912, 913 [FIG. 7(A)]. In addition, the pressure oil of the secondary chambers of the table cylinders 912, 913 is fed into the secondary chamber of the table driving cylinder 305 after passing through the secondary-chamber transfer valve 915.

In contrast, the pressure oil of the primary chambers of the other drive cylinders 301, 302, 303, 304 is fed into the secondary chambers of the same drive cylinders after passing through the corresponding drive-cylinder transfer valves 916.

Incidentally, since the pipes connected to the secondary chambers of the drive cylinders 301, 302, 303, 304, 305 are passed through the interior of a heat exchanger 399 [FIG. 5(A)], the working oil in these drive cylinders is held at a predetermined temperature at all times.

The heat exchanger 399 is maintained in a cold water state in such a way that underground water is caused to flow into a tank being open upwards and is circulated therein. Cooling pipes, each of which is made of a thick-walled copper pipe and is formed in a manner to meander in the cooling water, are disposed in the tank. Both the ends of each of the cooling pipes are joined to the corresponding pipe connected to the secondary chamber of the drive cylinder, through joints which are mounted on the lower surface of a lid covering the opening of the tank.

As stated before, the oil draining ports of the two plunger pumps 410 of the electromagnetic pressure-oil supply apparatus 398 [FIGS. 5(A) and 5(D)] are respectively held in communication with the pipes laid between the primary-chamber transfer valves 914 and the primary chambers of the cylinders 907, 908, 909, 910 and 911, and 912 and 913, by the pipes through the five manual valves 904 provided in the primary-chamber manual valve kit 392. Also, the pipes laid between the secondary-chamber transfer valves 915 and the secondary chambers of the above cylinders are respectively held in communication with the oil supplying ports of the electromagnetic pressure-oil supply apparatus 398 through the five manual valves 905 and the coupling portion 495 provided in the secondary-chamber manual valve kit 393 [FIGS. 5(A), 5(D) and 5(F)].

Accordingly, when the solenoid 412 of the electromagnetic pressure-oil supply apparatus 398 [FIG. 5(0)] is energized after opening the manual valve 904 of the primary-chamber manual valve kit 392 and the manual valve 905 of the secondary-chamber manual valve kit 393 held in communication with the cylinder(s) to-be-operated in FIG. 5(A), the pressure oil in a quantity which has been set with the scale 409 of the scale bar 405 by shifting the slide bracket 408 of the pump lever 404 is fed from the oil draining -ports of the two plunger pumps 410 of the electro-magnetic pressure-oil supply apparatus 398. This pressure oil is allowed to pass through the opened manual valve 904 of the primary-chamber manual valve kit 392 and is fed into the primary chamber(s) of the cylinder(s) to-be-operated, thereby to move the rod(s) of the cylinder(s) a predetermined magnitude. Simultaneously, the pressure oil of the secondary chamber(s) of the cylinder(s) in the same quantity as that of the pressure oil fed into the primary chamber(s) of the cylinder(s) is allowed to pass through the opened manual valve 905 of the secondary-chamber manual valve kit 393 and is fed into the oil supplying ports of the two plunger pumps 410 of the electromagnetic pressure-oil supply apparatus 398.

Automatic-feed Cutting Operation

Now, a cutting operation based on automatic feed will be exemplified. By way of example, there will be explained a case of cutting a workpiece in such a way that the table 31 is reciprocatively moved in the lateral direction in FIG. 1(B), that a milling cutter set on the distal end of the spindle guide 40 mounted in the vertical direction is rotated in the horizontal direction, and that the milling cutter is moved perpendicularly into the sheet of FIG. 1(B), in other words, that the saddle 38 is moved leftwards in FIG. 1(A).

The power switch 19 in FIGS. 1(A) and 1(C) is turned ON, and the high-speed switch 1 and low-speed switch 2 are subsequently turned ON. Then, the brake motor 344 of the high speed side driver [FIG. 4(A)] and the brake motor 337 of the low speed side driver FIG. 4(D)] are rotated. Next, the saddle cylinders 910, 911 are operated to move the saddle 38 by the saddle manual-feed apparatus 901 [FIG. 1(A)], and the spindle guide cylinder 907 is lowered by the spindle guide and column guide manual-feed apparatus 903, until the face of the milling cutter set on the distal end of the spindle guide 40 comes to the position of the workpiece to-be-cut the above operations of the manual feed apparatuses will be described later]. At the next step, when the table switch 3 [FIG. 1(C)] is turned ON, the primary-chamber transfer valve 914 and secondary-chamber transfer valve 915 interposed between the table driving cylinder 305 and the table cylinders 912, 913 are opened with the primary-chamber transfer valves 914 and secondary-chamber transfer valves 915 of the other drive cylinders kept closed, and the drive-cylinder transfer valve 916 interposed between the primary chamber and secondary chamber of the table driving cylinder 305 is closed with the drive-cylinder transfer valves 916 of the other drive cylinders kept open [FIG. 5(A)].

The automatic-feed high/low speed change-over switch 14 and high/low speed motor change-over switch 20 [FIG. 1(C)] are combined for the setting that the ascent of the feed plate 314 [FIG. 4(B)] is effected by the brake motor 337 of the low speed side driver, while the descent thereof is effected by the brake motor 344 of the high speed side. Then, the limit switches 391, 391 mounted on the upper and lower sides of the guide bar 319 of the hydraulic drive system FIGS. 4(A) and 4(J)] are electrically connected with the solenoids 345, 338 of the clutch change-over device [FIG. 4(H)], and the detection signals of the limit switches 391, 391 operate the solenoids 345, 338 of the clutch change-over device.

The slide bracket 408 of the electromagnetic pressure-oil supply apparatus 398 is set [FIG. 5(D)], and those manual valves 904, 905 of the primary-chamber manual valve kit 392 and the secondary-chamber manual valve kit 393 which communicate with the saddle cylinders 910, 911 are opened.

Subsequently, the solenoid 345 [FIG. 4(H)] of the clutch change-over device [FIG. 4(H)] of the hydraulic drive system is energized, and the turning force of the brake motor 344 of the high speed side driver [FIG. 4(A)] is transmitted to the high speed side input shaft of the gear box 326 through the rotor 339 [FIGS. 4(D) and 4(G)], to rotate the feed rod 309 and to lower the feed plate 314 [FIG. 4(B)].

Then, the pressure oil of the secondary chamber of the table driving cylinder 305 is fed into the secondary chambers of the table cylinders 912, 913 through the primary-chamber transfer valve 914, and the table 314 is moved rightwards in FIG. 1(B). Accordingly, the workpiece placed on the table 31 is moved rightwards in FIG. 1(B) while being cut by the rotating milling cutter. Herein, as the feed plate 314 is lowered, the guide device 320 mounted on the distal end of the rod of the saddle driving cylinder 304 descends, and the lever 323 [FIG. 4(J)] mounted under the guide device 320 descends. In consequence, the protrusion of the block 324 attached to the lower end of the lever 323 presses the lower limit switch 391.

Thus, the solenoid 338 of the clutch change-over device [FIG. 4(H)] is energized by the detection signal produced from the lower limit switch 391, and the turning force of the brake motor 337 of the low speed side driver is transmitted to the feed rod 309 through the clutch 328. Therefore, the feed rod 309 is changed-over to the reverse rotation, and the feed plate 314 is raised, so that the pressure oil of the primary chamber of the table driving cylinder 305 [FIG. 5(A)] is fed into the primary chambers of the table cylinders 912, 913, and the table 31 is moved leftwards in FIG. 1(B). Since, on this occasion, the detection signal generated by the lower limit switch 391 energizes the solenoid 412 of the electro-magnetic pressure-oil supply apparatus 398 [FIG. 5(D)], the pressure oil of the two plunger pumps 410 of the electromagnetic pressure-oil supply apparatus 398 is fed into the primary chambers of the saddle cylinders 910, 911 through the opened manual valve 904 of the primary-chamber manual valve kit 392.

Accordingly, the saddle 38 is moved a preset magnitude leftwards as viewed in FIG. 1(A). Subsequently, the workpiece set on the table 31 is moved leftwards in FIG. 1(B) and is therefore cut by the milling cutter of the spindle guide 40. Meantime, when the block 324 in FIG. 4(J) presses the upper limit switch 391 owing to the ascent of the feed plate 314, the table 31 is changed-over to the rightward movement, and simultaneously, the saddle 38 is further moved in the direction of the cutting a preset magnitude. Thenceforth, the above steps are repeated.

When, at the completion of the cutting operation, the opened manual valves 904 and 905 of the primary-chamber manual valve kit 392 and secondary-chamber manual valve kit 393 are closed, the cutting ends. Subsequently, the table 31 is stopped by turning OFF the high/low speed motor change-over switch 20.

Although one example of the cutting operation has been explained in the above, various machining operations of workpieces can be carried out by actuating the plurality of drive cylinders and the electromagnetic pressure-oil supply apparatus 398 in the hydraulic drive system of the present invention in combination.

Pipes for and Operations of Manual Feed Apparatuses

Pipes concerning the several manual feed apparatuses 901, 902, 903 will be described.

Referring to FIG. 5(A), the primary chambers of the saddle manual-feed apparatus 901 and table manual-feed apparatus 902 are respectively held in communication with the primary chambers of the saddle cylinders 910, 911 and table cylinders 912, 913 by the pipes through magnetic check valves 919 which are opened when energized. The secondary chambers of the saddle cylinders 910, 911 and table cylinders 912, 913 are respectively held in communication with the secondary chambers of the saddle manual-feed apparatus 901 and table manual-feed apparatus 902 through magnetic check valves 919 which are opened when energized.

In addition, the primary chamber and secondary chamber of the spindle guide and column guide manual-feed apparatus 903 are respectively held in communication with the primary chambers and secondary chambers of the spindle guide cylinder 907 and column guide cylinders 908, 909 through the solenoid valve 346 [FIG. 5(A)]. In this regard, the manual valves 906, 906 provided in the manual valve kit 397 are respectively interposed in the pipes laid between the magnetic transfer valve 346 and the primary and secondary chambers of the spindle guide cylinder 907, and magnetic check valves 919 which are opened when energized are respectively interposed in the pipes laid between the solenoid valve 346 and the primary and secondary chambers of the column guide cylinders 908, 909.

The operations of the manual feed apparatuses will be described with reference to FIG. 5(A). When the spindle guide cylinder 907 is to be operated, the manual valves 906 of the manual valve kit 397 are opened, the solenoid valve 346 is transferred to the side of the spindle guide cylinder 907 by an electromagnetic change-over switch 10 [FIG. 1(C)], and the handle 812 of the spindle guide and column guide manual-feed apparatus 903 [FIGS. 3(A) and 3(B)] is turned.

On the other hand, when the column guide cylinders 908, 909 are to be operated, the solenoid valve 346 is transferred to the side of the column guide cylinders 908, 909 by the electromagnetic change-over switch 10, the magnetic check valves 919 are opened by turning ON a column-guide manual switch 9, and the handle 812 of the spindle guide and column guide manual-feed apparatus 903 is turned.

Besides, when the saddle cylinders 910, 911 are to be operated, the magnetic check valves 919 are opened by turning ON a saddle manual switch 8, and the handle 812 of the table manual-feed apparatus 902 [FIGS. 3(A) and 3(B)] is turned.

Further, when the table cylinders 912, 913 are to be operated, the magnetic check valves 919 are opened by turning ON a table manual switch 7, and the handle 812 of the saddle manual-feed apparatus 901 [FIGS. 3(A) and 3(B)] is turned.

By the way, in case of changing-over the manual feed operation to the automatic feed operation stated before, the manual valves 906 of the manual valve kit 397 are closed, and the magnetic check valves 919 are closed by turning OFF the switches 7, 8, 9.

However, in a case where a manual feed operation is performed again without a long temporal interval or where a very high machining precision is not required, the pressure oil between the spindle guide/ column guide manual-feed apparatus 903 and the spindle guide cylinder 907 is cut off by transferring the solenoid valve 346 to the side of the column guides 34 with the electromagnetic change-over switch 10. Further, the feed screw 807 of the handle 812 is fixed and stopped rotating by the setscrew 816 of the spindle guide/column guide manual-feed apparatus 903 [FIGS. 3(A) and 3(F)]. Besides, the rotations of the handles 812 are similarly stopped by the setscrews 816 in the other manual-feed apparatuses 901, 902.

Figure 5M:
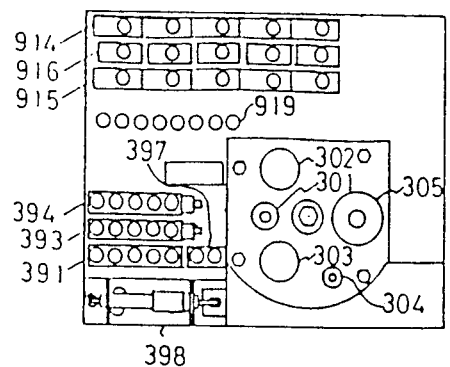
FIG. 5(M) is a plan view of a valve mounting plate which is fixed on a trestle.
Figure 5K:
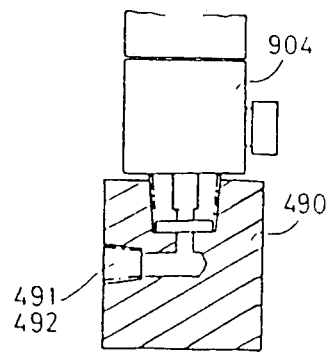

Incidentally, the electromagnetic pressure-oil supply apparatus 398, the various transfer valves, the valve kits, etc. are arranged on the upper surface of the cylinder frame 306 of the hydraulic drive system [FIG. 4(A)] and on the upper surface of a valve mounting plate provided in the framework 325 [FIG. 5(M)].

PLACES FOR MOUNTING ELECTROMAGNETIC PRESSURE-OIL SUPPLY APPARATUS 398, TRANSFER VALVES AND VALVE KITS

The five primary-chamber transfer valves 914, five secondary-chamber transfer valves 915, five drive-cylinder transfer valves 916, eight magnetic check valves 919, manual valve kit 397, solenoid valve 346, electromagnetic pressure-oil supply apparatus 398, primary-chamber manual valve kit 392, secondary-chamber manual valve kit 393 and oil supply valve kit 394, which are shown in FIG. 5(A), are arranged on the upper surface of the cylinder frame 306 of the hydraulic drive system [FIG. 4(A)] and on the upper surface of the valve mounting plate provided in the framework 325 FIG. 5(M)].

FIG. 5(M) is the top plan view of the valve mounting plate. A doored distribution box is provided over the valve mounting plate as viewed in the figure, and the various solenoid valves 914, 915, 916 and magnetic check valves 919 mentioned above are disposed on the upper surface of the distribution box in order. The upper surface of the steel plate is provided with stages under the distribution box as viewed in the figure, and the valve kits 394, 393, 392, 397 and electromagnetic pressure-oil supply apparatus 398 are disposed on the respective stages so that the operator may be easily manipulate them.

On the lower side of the front of the framework 325 [FIG. 4(A)], there are disposed the speed change knobs (with wire cables) of the stepless transmissions 341, 333 of the high speed side and low speed side drivers [FIG. 4(D)], and the regulator valves (with pressure gauges) of a compressor 357, a lubricating oil pressure tank 358 and the lubricating oil pressure tank 359 [FIG. 5(A)].

The present invention achieves the following effects:

(1) Pressure oil in drive cylinders and actuating cylinders is normally fed only between the respectively corresponding cylinders, so that any unstable factor of the quantities of the pressure oil to be supplied to the cylinders does not arise. Accordingly, the rods of the cylinders can be finely moved in stable conditions, which makes it possible to machine a workpiece reliably and precisely.

(2) A plurality of drive cylinders can be operated by only one rotation drive means, and a hydraulic drive mechanism capable of reliably actuating individual movable members with a simple structure can be provided.

(3) A gear box 326 having a plurality of input shafts is provided for a feed rod 309, and rotation drive means of rotating speeds unequal to one another are respectively connected to the plurality of input shafts through clutches capable of interlocking with one another. It is therefore possible to provide a hydraulic drive mechanism in which the high speed machining and high precision machining of a workpiece are compatible and whose structure is simple.

(4) Primary-chamber transfer valves 914 and secondary-chamber transfer valves 915 are interposed in pipes laid between the primary chambers and secondary chambers of drive cylinders and corresponding actuating cylinders, and drive-cylinder transfer valves 916 are interposed in pipes laid between the primary chambers and secondary chambers of the drive cylinders. It is therefore possible to provide a hydraulic drive mechanism which can appropriately supply pressure oil to the actuating cylinder for actuating one of a plurality of movable members.

(5) Owing to the provision of an apparatus in which proper quantities of pressure oil can be generated in plunger pumps 410 by energizing a solenoid 412, a movable member can be finely moved automatically. It is therefore possible to provide a hydraulic drive mechanism capable of the precise machining of a workpiece and the automatic cutting operation thereof.

(6) Owing to the provision of manual feed cylinders corresponding to a plurality of actuating cylinders, it is possible to provide a manual-feed hydraulic drive mechanism which can actuate movable members according to the circumstances, which can enhance the job efficiency of the machining of a workpiece and in which the quantities of oil in pipes laid between the actuating cylinders and corresponding drive cylinders can be kept constant.

What is claimed is:

1. In a machine tool with a plurality of reciprocatively movable members, having a bed, a table which is slidably disposed on an upper surface of the bed so as to extend in a lengthwise direction of the bed, two columns which are erected perpendicularly to an upper surface of the table on both sides of the table in a widthwise direction thereof, column guides which are respectively mounted on the two columns so as to be vertically slidable, a cross girder which is fixed between the column guides and which is contrived so as to be vertically movable in the direction perpendicular to the upper surface of the table, and a saddle which is mounted on one side surface of the cross girder so as to be slidable in parallel with the upper surface of the table and on which a working tool for machining a workpiece is set:

a hydraulic drive mechanism characterized in that at least one of said plurality of reciprocatively movable members is connected to a rod of a double-acting cylinder, that a primary chamber and a secondary chamber of said cylinder are respectively connected to a primary chamber and a secondary chamber of a double-acting drive cylinder being an oil pressure source which corresponds to the first-mentioned cylinder, while a drive-cylinder transfer valve which communicates and shuts off said primary and secondary chambers of said drive cylinder is interposed in a pipe line laid between said chambers, that a rod of said drive cylinder is inserted through a through hole which is provided in a cylinder frame, that said drive cylinder is fixed to one surface of said cylinder frame, that the other surface of said cylinder frame is confronted to a base frame through an appropriate spacing, that both ends of a feed rod which is connected to front-ward/reverse rotation drive means are respectively journaled in bearings by said base frame and said cylinder frame, that a feed plate is threadably mounted on said feed rod midway between said cylinder frame and said base frame, and that a distal end of said rod of said drive cylinder is turnably connected to said feed plate.

2. A hydraulic drive mechanism in a machine tool as defined in claim 1, wherein at least two or all of said plurality of reciprocatively movable members are connected to rods of a plurality of double-acting cylinders, primary chambers and secondary chambers of said plurality of cylinders are respectively connected to primary chambers and secondary chambers of a plurality of double-acting drive cylinders being oil pressure sources which correspond to the first-mentioned cylinders, a transfer valve which communicates and shuts off said primary and secondary chambers of said each drive cylinder is interposed in a pipe line laid between said chambers, and transfer valves are respectively interposed in pipe lines which communicate said primary and secondary chambers of said plurality of cylinders with said primary and secondary chambers of said plurality of double-acting drive cylinders corresponding to the first-mentioned cylinders.

3. A hydraulic drive mechanism in a machine tool as defined in claim 1, wherein said base frame includes an oil pan which is open upwards, said cylinder frame is fixed to an upper surface of said oil pan through a plurality of struts, and both said ends of said feed rod are respectively journaled in bearings by said cylinder frame and a bottom of said oil pan.

4. A hydraulic drive mechanism in a machine tool as defined in claim 1, wherein the axial end of said feed rod is connected to an output shaft of a gear box, a plurality of input shafts of said gear box are respectively provided with clutches through which rotation drive means including a low speed side motor and a high speed side motor are connected to said input shafts, and an actuating input is applied to only a selected one of said plurality of clutches.

5. A hydraulic drive mechanism in a machine tool as defined in claim 4, wherein one end of each of two clutch forks is connected to a corresponding one of said clutches provided for the low speed side and high speed side input shafts, the other ends of said clutch forks are respectively connected to both ends of a slide rod and are slidably inserted in a slide rod bracket mounted in said gear box, a pin which is protrusively provided substantially centrally of said slide rod in a lengthwise direction thereof is inserted through a slot provided in said slide rod bracket, a distal end of said pin is held in engagement with a slot of a rocker provided in said gear box, and rods of solenoids are connected to said rocker.

6. A hydraulic drive mechanism in a machine tool as defined in claim 2, wherein said primary chambers and said secondary chambers of said plurality of cylinders are respectively connected to primary chambers (discharge chambers) and secondary chambers (suction chambers) of plunger pumps, a piston rod of each of said plunger pumps is connected to one end of a pump lever, the other end of said pump lever is connected to a rod of a solenoid, and a fulcrum pin is mounted so as to be adjustably movable in a lengthwise direction of said pump lever and to be capable of abutting against a front end face of said pump lever in a direction in which said pump lever is lowered by said rod of said solenoid.

7. A hydraulic drive mechanism in a machine tool as defined in claim 6, wherein distal ends of said rods of said solenoids are inserted, and protruding ends of said rods are respectively furnished with springs, thereby to urge right and left parts of said rocker so as to turn in directions opposite to each other.

8. A hydraulic drive mechanism in a machine tool as defined in claim 6, wherein manual valves are interposed in pipes which communicate said primary chambers (discharge chambers) and said secondary chambers (suction chambers) of said plunger pumps with said primary chambers and said secondary chambers of said plurality of cylinders, respectively.

9. A hydraulic drive mechanism in a machine tool as defined in claim 1, wherein said primary chambers and said secondary chambers of the plurality of cylinders are respectively connected to primary chambers and secondary chambers of a plurality of double-acting cylinders corresponding to the first-mentioned cylinders, through transfer valves, a feed screw is journaled in a bearing so as to extend in a lengthwise direction of each of said double-acting cylinders, a guide section is threadably engaged on one end side of said feed screw, one end of said guide section is fixed to distal ends of rods of said plurality of double-acting cylinders, so as to permit said guide section to slide through rotation of said feed screw, and a handle is mounted on the other end of said feed screw, thereby to construct a manual feed cylinder.

10. A hydraulic drive mechanism in a machine tool as defined in claim 9, wherein a rod of said manual feed cylinder is urged toward a distal end of said rod through a spring.

11. A hydraulic drive mechanism in a machine tool as defined in claim 8, wherein an annular scale plate whose outer peripheral surface is graduated is fixed to an outer periphery of said feed screw on a side of said handle, and an indicator plate which indicates the graduation is fixed to said manual feed cylinder with a spacing from an end surface of said scale plate.

* * * * *